(12) United States Patent
Bejcek et al.

(10) Patent No.: US 11,096,326 B2
(45) Date of Patent: Aug. 24, 2021

(54) SHUTTER LOCKING ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventors: Andrew E. Bejcek, Chapel Hill, NC (US); Scott J. Kaskawitz, Hillsborough, NC (US); Surender Kumar, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 365 days.

(21) Appl. No.: 16/243,127

(22) Filed: Jan. 9, 2019

(65) Prior Publication Data

US 2020/0214201 A1    Jul. 9, 2020

(51) Int. Cl.
| | | |
|---|---|---|
| A01D 34/71 | (2006.01) | |
| A01D 34/81 | (2006.01) | |
| A01D 43/08 | (2006.01) | |
| A01D 43/063 | (2006.01) | |
| A01D 34/68 | (2006.01) | |
| A01D 101/00 | (2006.01) | |

(52) U.S. Cl.
CPC ............. *A01D 34/71* (2013.01); *A01D 34/81* (2013.01); *A01D 43/08* (2013.01); *A01D 34/68* (2013.01); *A01D 43/063* (2013.01); *A01D 2101/00* (2013.01)

(58) Field of Classification Search
CPC ........ A01D 34/71; A01D 34/81; A01D 43/08; A01D 43/063; A01D 34/68; A01D 2101/00; A01D 34/005
See application file for complete search history.

(56) References Cited

U.S. PATENT DOCUMENTS

| | | | | |
|---|---|---|---|---|
| 3,531,923 | A * | 10/1970 | De Lay ................ | A01D 34/005 56/12.8 |
| 4,263,771 | A * | 4/1981 | Iaboni ................. | A01D 34/005 56/13.4 |
| 4,577,455 | A * | 3/1986 | Amano ................ | A01D 34/64 56/17.1 |
| 6,751,937 | B2 * | 6/2004 | Kobayashi ............ | A01D 34/71 56/202 |
| 6,843,048 | B2 * | 1/2005 | Osborne .............. | A01D 42/005 56/320.2 |
| 6,854,253 | B2 | 2/2005 | Dickey | |

(Continued)

*Primary Examiner* — Arpad Fabian-Kovacs
(74) *Attorney, Agent, or Firm* — Kenealy Vaidya LLP

(57) ABSTRACT

A shutter assembly for a lawnmower can include a cutter housing, a shutter, and a lever. The shutter can be rotatably attached to the cutter housing so as to be movable between (a) a first shutter position in which a blocking panel is positioned such that the blocking panel opens the discharge opening, and (b) a second shutter position in which the blocking panel is positioned such that the blocking panel closes the discharge opening, and the second shutter position corresponds to a mulching position. The lever can be attached to the shutter and extend through the cutter housing slot. The lever can move the shutter between the first shutter position and the second shutter position. The lever can include a handle knob assembly that includes a button that is biased, by a spring, to lock in any one of a plurality of positions on the cutter housing.

20 Claims, 17 Drawing Sheets

(56) References Cited

U.S. PATENT DOCUMENTS

| | | | |
|---|---|---|---|
| 6,862,875 B2* | 3/2005 | Iida | A01D 34/71 56/320.2 |
| 6,874,310 B2 | 4/2005 | Osborne | |
| 7,055,301 B2* | 6/2006 | Osborne | A01D 42/005 56/320.1 |
| 7,571,593 B2* | 8/2009 | Kucera | A01D 43/063 56/202 |
| 7,805,920 B2 | 10/2010 | Hurst et al. | |
| 7,814,739 B2 | 10/2010 | Uemura et al. | |
| 7,866,135 B2* | 1/2011 | Davis | A01D 34/71 56/320.2 |
| 8,015,786 B2* | 9/2011 | Minami | A01D 42/005 56/320.2 |
| 8,132,396 B2* | 3/2012 | Minami | A01D 42/005 56/320.2 |
| 8,234,849 B2 | 8/2012 | Shimozono et al. | |
| 9,043,957 B2 | 6/2015 | Kaskawitz | |
| 9,699,963 B2 | 7/2017 | Ressler et al. | |
| 2003/0217542 A1* | 11/2003 | Osborne | A01D 42/005 56/320.1 |
| 2018/0184590 A1 | 7/2018 | Takahashi et al. | |

* cited by examiner

SHUTTER LOCKING ASSEMBLY FOR A LAWNMOWER, LAWNMOWER HAVING SAME, AND CONVERTIBLE LAWNMOWER

BACKGROUND

Lawnmowers can be configured as garden tractors, riding mowers, commercial walk-behind mowers and smaller walk-behind mowers. Smaller walk-behind mowers can include a prime mover mounted to the deck of the lawnmower. Mower decks associated with garden tractors, riding mowers and commercial walk-behind mowers can be removably attached to the frame of these self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute. Mulching mowers cut the clippings into fine particles and blow the clippings back into the lawn. Discharge mowers either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly mounted within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching system in which one or more movable components can be moved into any one of a plurality of positions between the mulching position and the discharging position such that some of the clippings are mulched and some of the clippings are discharged, via the discharge chute, into a collection bag or onto the ground.

SUMMARY

Some embodiments are directed to a shutter assembly for a lawnmower that can include a cutter housing, a shutter, and a lever. The cutter housing can include a discharge opening and a cutter housing slot passing through the cutter housing. The cutter housing slot can have a first end and a second end. The shutter can include a blocking panel. The shutter can be rotatably attached to the cutter housing so as to be movable between (a) a first shutter position in which the blocking panel is positioned such that the blocking panel opens the discharge opening, and (b) a second shutter position in which the blocking panel is positioned such that the blocking panel closes the discharge opening, and the second shutter position corresponds to a mulching position. The lever can be attached to the shutter and extend through the cutter housing slot. The lever can be engageable by a user so as to move the shutter between the first shutter position and the second shutter position. The lever can include a handle knob assembly that includes a button that is biased, by a spring, to lock in any one of a plurality of positions on the cutter housing.

Some embodiments are directed toward a lawnmower that can include a shutter assembly and a prime mover. The shutter assembly can include a cutter housing, a shutter, and a lever. The cutter housing can include a discharge opening and a cutter housing slot. The shutter can include a blocking panel. The shutter can be rotatably attached to the cutter housing so as to be movable between (a) a first shutter position in which the blocking panel is positioned such that the discharge opening is opened by the blocking panel, and (b) a second shutter position in which the blocking panel is positioned such that the discharge opening is closed by the blocking panel, and the second position corresponds to a mulching position. The lever can be attached to the shutter and extend through the cutter housing slot. The lever can be engageable by a user so as to move the shutter between the first shutter position and the second shutter position, and the lever includes a handle knob assembly that includes a button that is biased, by a spring, to lock in any one of a plurality of positions on the cutter housing. The prime mover can be mounted on the cutter housing and configured to rotate a blade for cutting vegetation.

Some embodiments are directed toward a convertible lawnmower that can be configure to be converted between a discharging mode and a mulching mode. The lawnmower can include a cutter housing, a collection bag, a shutter, and a lever. The cutter housing can include a discharge opening, a discharge chute in communication with the discharge opening, and a cutter housing slot in the cutter housing. The collection bag can be removably connected to the cutter housing and configured to receive vegetation clippings passing through the discharge opening when the lawnmower is in the discharging mode. The shutter can include a blocking panel. The shutter can be rotatably attached to the cover so as to be movable between (a) a first shutter position in which the blocking panel is positioned such that the discharge opening is opened by the blocking panel and the vegetation clippings are directed through the discharge opening and toward the collection bag when the collection bag is connected to the discharge chute, and (b) a second shutter position in which the blocking panel is positioned such that the discharge opening is closed by the blocking panel, and the second position corresponds to a mulching position. The lever can be attached to the shutter and extend through the cutter housing slot. The lever can be engageable by a user so as to move the shutter between the first shutter position and the second shutter position. The lever includes a handle knob assembly that includes a button that is biased, by a spring, to lock in any one of a plurality of positions on the cutter housing. The plurality of positions can include a first lever lock position that corresponds to the shutter being in the first shutter position so as to allow cut clippings to be discharged through the discharge opening, and a second lever lock position that corresponds to the shutter being in the second shutter position so as to allow mulching of the cut clippings.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Some mulching assemblies that remain mounted in the cutter housing of the lawnmower can include many components, which can result in a labor-intensive assembly for manufacturing. Thus, the manufacturing cost can increase as compared to a lawnmower that includes a removable conversion assembly. However, the operator can perceive the removal and installation processes of the removable conversion assembly as inconvenient. Thus, there is a need for a mulching assembly that can reduce manufacturing cost and lessen or avoid any inconvenience perceived by the operator when converting the lawnmower between the discharge mode and the mulching mode.

Figure 1:
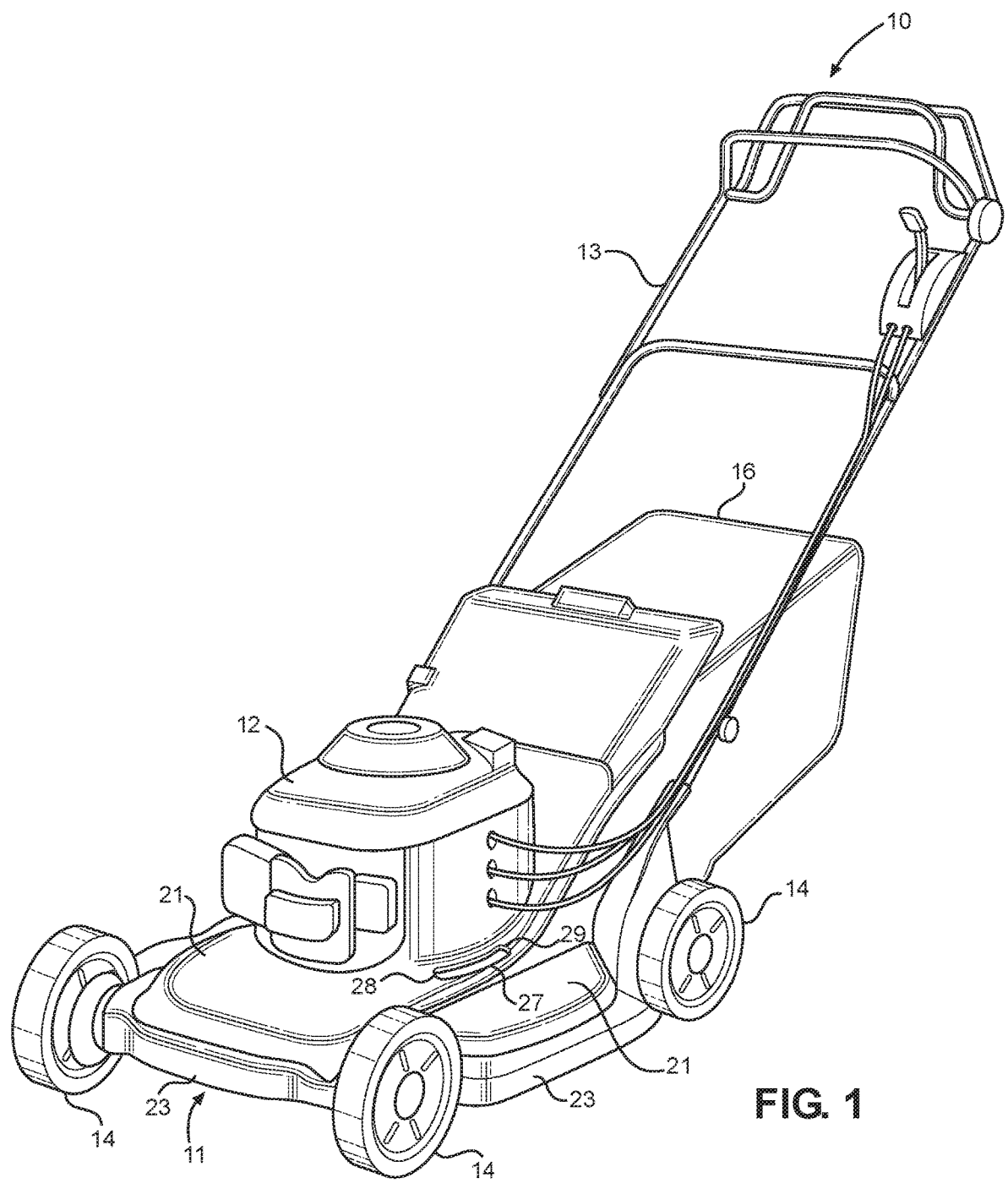
FIG. 1 is a perspective view of a lawnmower in accordance with the disclosed subject matter.
Figure 2:
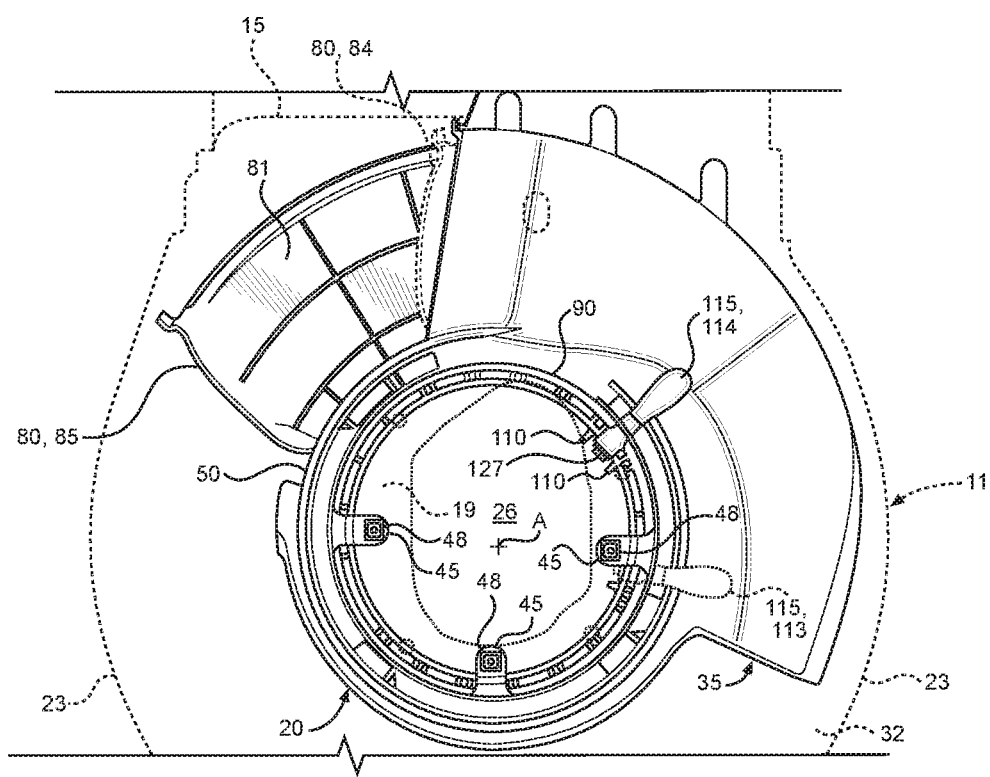
FIG. 2 is a top view of a portion of the lawnmower of FIG. 1, showing a shutter assembly with a cutter housing shown in phantom, in accordance with the disclosed subject matter.
Figure 8:
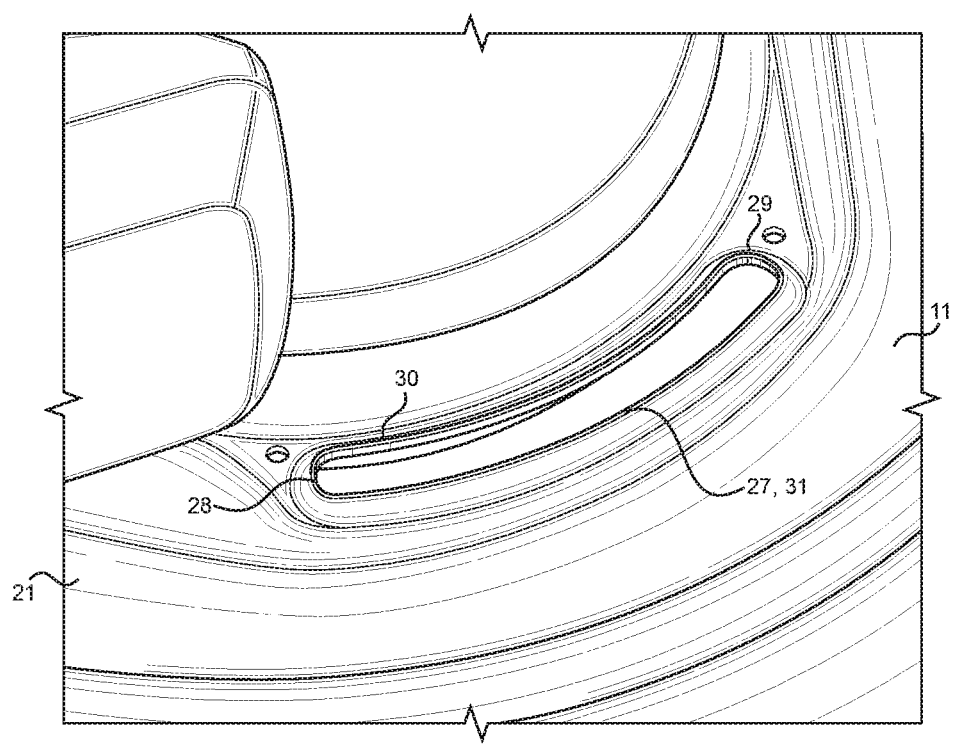
FIG. 8 is a top view of a portion of a cutter housing of the lawnmower of FIG. 1 and shows the cutter housing slot.
Figure 9:
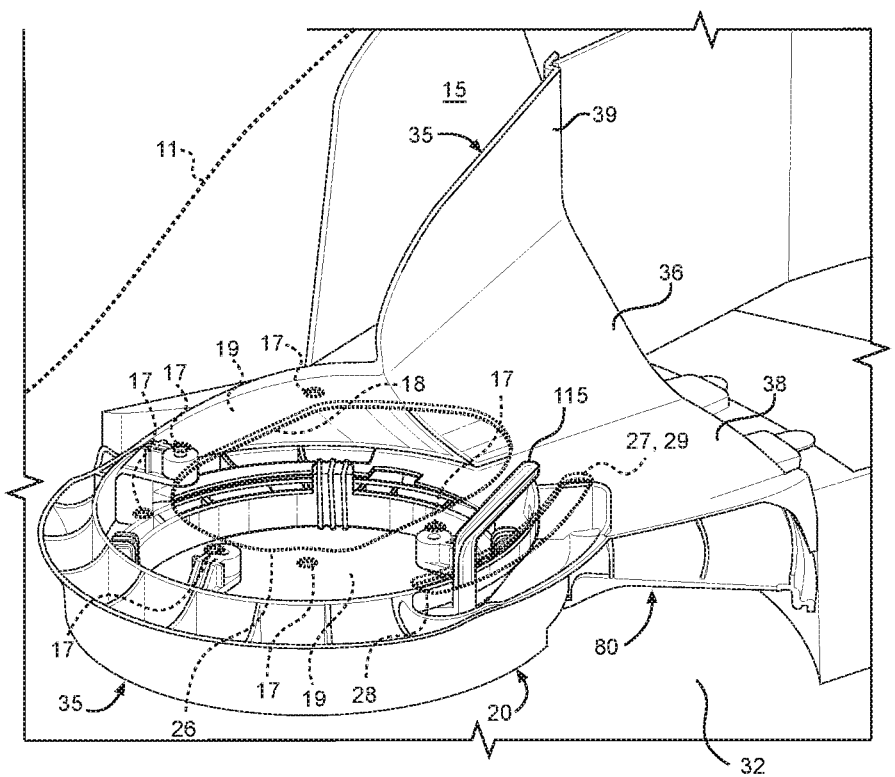
FIG. 9 is a perspective view of the shutter assembly of FIG. 2 with the cutter housing and the cutter housing slot shown in phantom.

FIG. 1 is a perspective view of a lawnmower 10 in accordance with one or more embodiments of the disclosure. The lawnmower 10 can include a cutter housing 11. The cutter housing 11 can also be referred to as a deck or as a mower deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. Referring to FIGS. 2 and 9, the mounting portion 19 of the exemplary embodiment of FIGS. 1-10 can surround an opening 26 at a central portion of the cutter housing 11, and can include a plurality of mounting holes 17 spaced around the opening 26. The prime mover 12 can drive a driveshaft that supports at least one blade. The blade(s) is/are omitted for clarity and simplicity of the drawings. The blade(s) can rotate in a cutting chamber 32 defined by the cutter housing 11 and opened toward the ground. In operation of the lawnmower, the prime mover 12 rotates the driveshaft, which, in turn, rotates the blade. As a result, the lawnmower 10 can perform a mowing operation on vegetation.

As shown in FIG. 1, the lawnmower 10 can include a steering handle 13 and a plurality of wheels 14. (FIG. 1 shows three wheels 14. A fourth wheel 14 at the right rear of the cutter housing 11 is obstructed from view in FIG. 1 by the prime mover 12 and a rear portion of the cutter housing 11). The steering handle 13 can be used by a user to operate the lawnmower 10 and guide the path of travel of the lawnmower 10. The steering handle 13 can include or be associated with various control mechanisms. Such control mechanisms can include speed controls for self-propelled lawnmowers. Such control mechanisms can include safety stop levers or bars, which the user must depress or hold to maintain the lawnmower in a running state. The wheels 14 of the lawnmower 10 can be of various shapes and sizes as desired. In a self-propelled lawnmower, the wheels 14 at the rear of the lawnmower 10 can be driven so as to propel the lawnmower 10.

Referring to FIGS. 1, 2 and 9, the lawnmower 10 can also include a discharge chute 15 and a collection bag 16. (The discharge chute 15 is obstructed from view in FIG. 1 by the prime mover 12, and is located at the rear of the cutter housing 11 and adjacent to the wheel 14 at the right rear of the cutter housing 11). The discharge chute 15 can be oriented to discharge the vegetation clippings toward the side of the lawnmower 10 or toward the rear of the lawnmower 10. In the exemplary embodiment of FIGS. 1-10, the discharge chute 15 can discharge the clippings toward the rear of the lawnmower 10. When the lawnmower 10 is in a discharging mode, lawn clippings, for example, can be propelled from the cutting chamber 32, in which the blade(s) spins and in which vegetation is cut by the spinning blade(s), of the lawnmower 10 into a discharge opening and through the discharge chute 15. The clippings can pass through the discharge chute 15 and into the collection bag 16. Once the collection bag 16 is filled with lawn clippings, or at any other time, the collection bag 16 can be emptied. Alternatively, the collection bag 16 can be removed from the lawnmower 10, and the lawnmower 10 can discharge the clippings through the discharge chute 15 and onto the ground.

As shown in FIG. 1, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or been separated by a particular feature of the lawnmower, such as a distinct bend or ridge. The top wall 21 can be integrally formed with the sidewall(s) 23. The top wall 21 and the sidewall(s) 23 can define the cutting chamber 32. For example, the top wall 21 and the sidewall(s) 23 can be integrally formed of stamped or cast metal or of molded plastic construction. In the exemplary embodiment of FIGS. 1-10, the cutter housing 11 is stamped from a steel sheet.

In accordance with embodiments of the disclosure, the lawnmower 10 can include a shutter assembly 20. The shutter assembly 20 can include a cutter housing slot 27. As shown in FIGS. 1, 8 and 9, the cutter housing slot 27 can be provided in the cutter housing 11. The cutter housing slot 27 can be provided in a top wall 21 of the cutter housing 11. Further, the cutter housing slot 27 can pass through the top wall 21 from an outer surface of the top wall 21 to an inner surface of the top wall 21. Referring to FIGS. 1, 8 and 9, the cutter housing slot 27 can be located between the wheel 14 at the left front corner of the cutter housing 11 and the wheel 14 at the left rear corner of the cutter housing 11. The cutter housing slot 27 can be located between the mounting portion 19 and the sidewall 23 on the left side of the cutter housing 11. The cutter housing slot 27 can be located closer to the mounting portion 19 than to the sidewall 23 on the left side of the cutter housing 11.

As described in further detail below, the shutter assembly 20 can further include a lever 115. The lever 115, shown in FIGS. 2 and 9, can be attached to a shutter 80 and extend through the cutter housing slot 27. Referring to FIGS. 1, 8 and 9, the cutter housing slot 27 can include a slot first end 28 and a slot second end 29. The user can move the lever 115 between the slot first end 28 and the slot second end 29 so as to move the shutter 80 between a discharging position and a mulching position, as will be discussed in further detail below. That is, the slot ends 28, 29 can delimit the movement of the lever 115 between a first lever position and a second lever position such that the shutter 80 is in the discharging position when the lever 115 is in the first lever position and the shutter 80 is in the mulching position when the lever 115 is the second lever position. Referring to FIG. 8, the cutter housing slot 27 can include an inner edge 30 and an outer edge 31. The outer edge 31 can be outboard of the inner edge 30. The cutter housing slot 27 can be arcuate in shape so as to accommodate an arcuate travel path of the lever 115, as will be explained in further detail below.

FIG. 2 is a top view of the lawnmower 10, showing shutter assembly 20 with the cutter housing 11 shown in phantom, in accordance with one or more embodiments of the disclosure. The shutter assembly 20 can include a cover 35 and a shutter 80. FIG. 2 shows lever 115, in phantom, in a first lever position 113. Additionally, FIG. 2 shows lever 115 in a second lever position 114. The lever 115 can be moved along and in the cutter housing slot 27 from the first lever position 113 to the second lever position 114 by a user. Specifically, a user can grasp lever 115 and move the lever along the length of cutter housing slot 27.

As shown in FIG. 2, the first lever position 113 corresponds to a first shutter position 84, i.e. a discharging position, which is shown in phantom in FIG. 2. The second lever position 114 corresponds to a second shutter position 85. The second lever position 114 corresponds to a mulching position.

Figure 3:
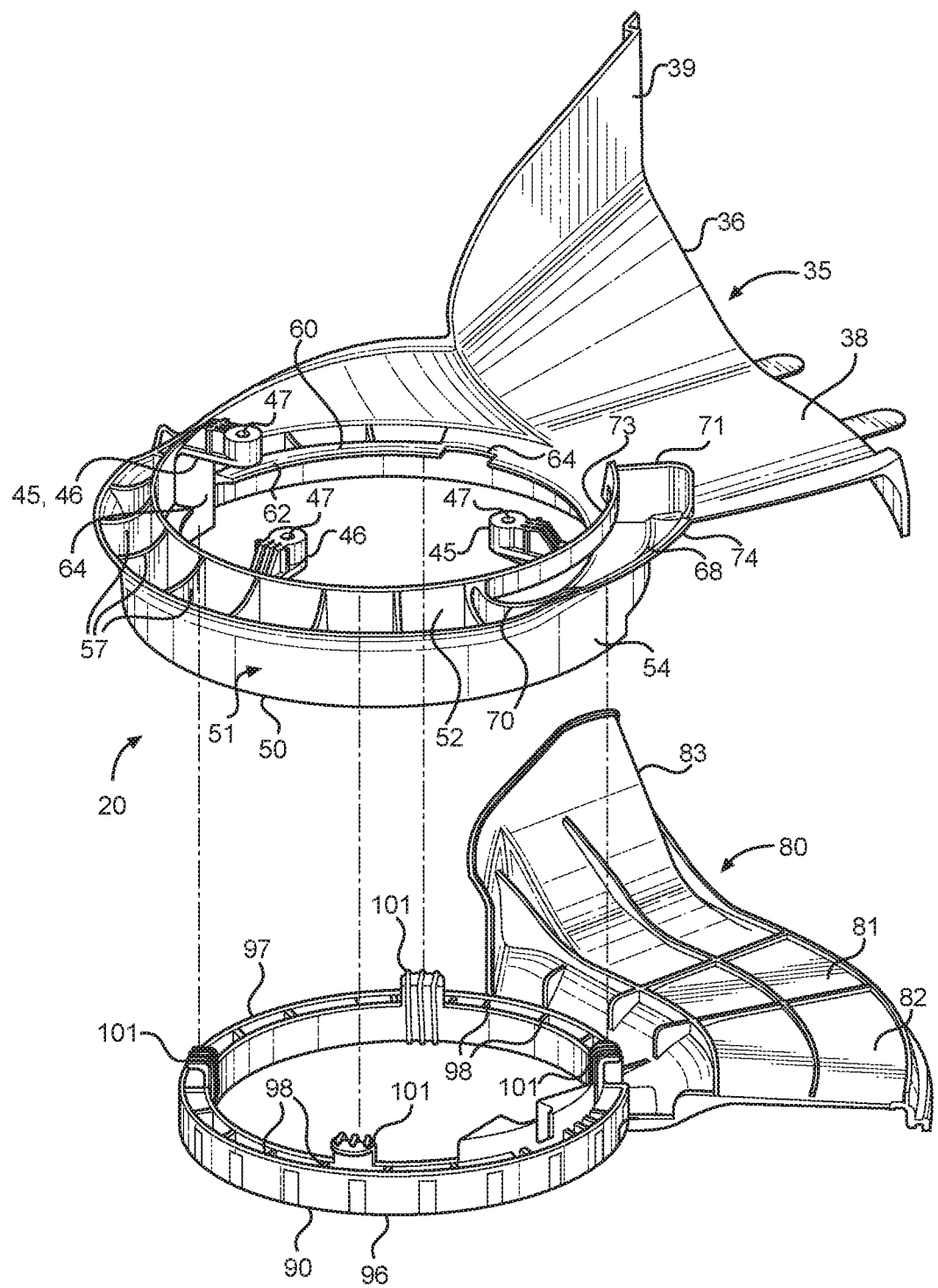
FIG. 3 is an exploded perspective view showing a cover and a shutter of the shutter assembly of FIG. 2.
Figure 4:
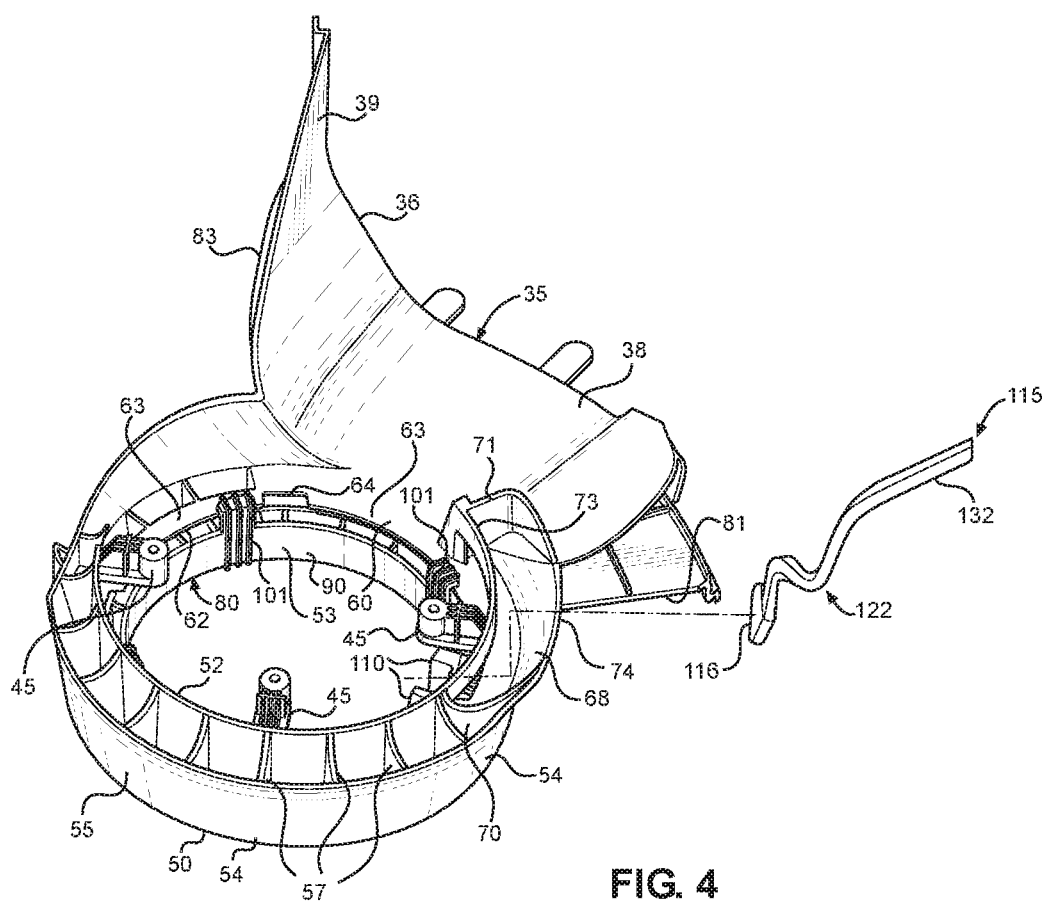
FIG. 4 is an exploded perspective view of a lever and the assembled cover and shutter of the shutter assembly of FIG. 2.
Figure 5:
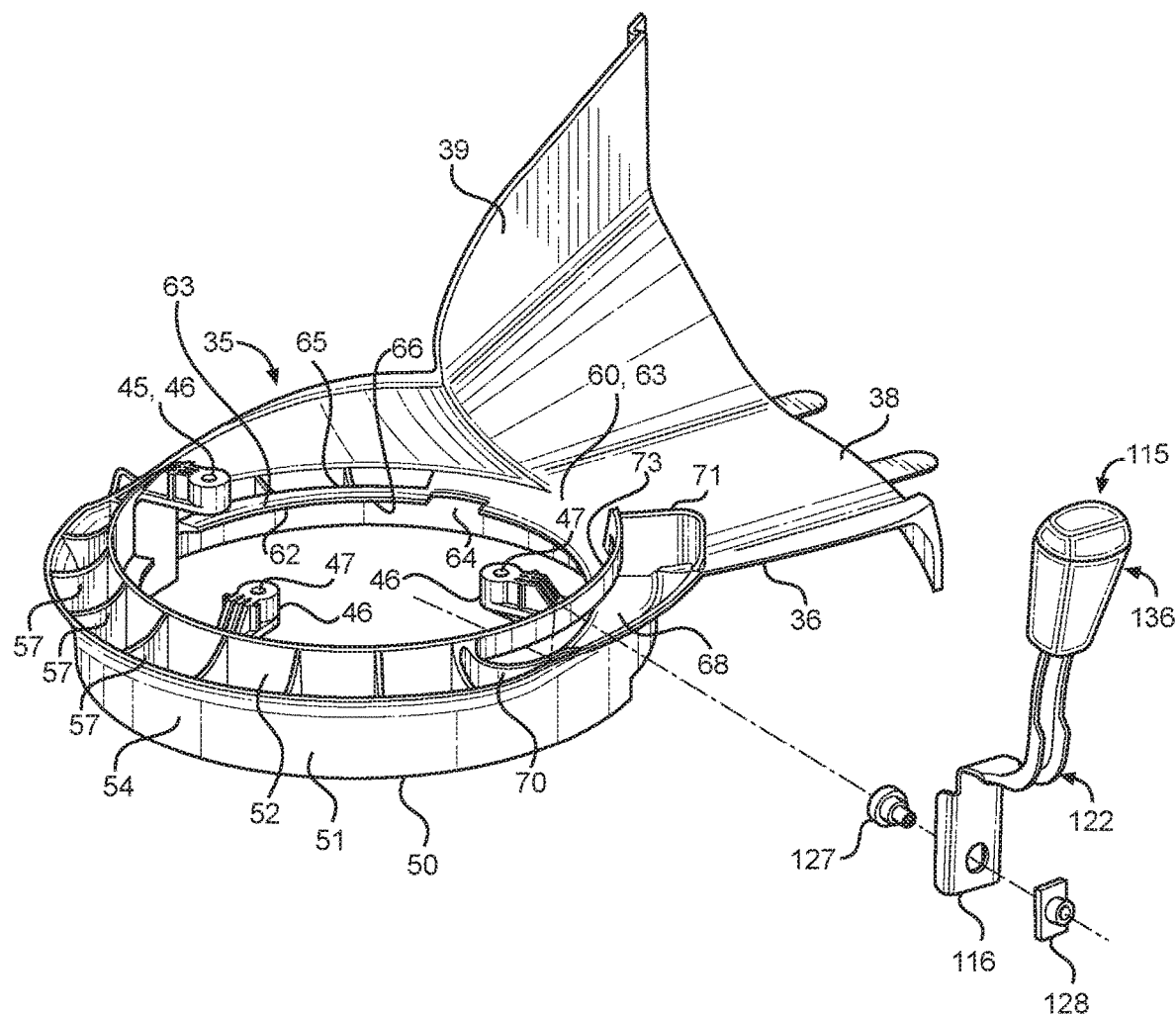
FIG. 5 is a perspective view of the cover and the lever of the shutter assembly of FIG. 2.

As is shown in FIG. 9, the cover 35 can be attached to an underside 18 or inner surface of the top wall cutter housing 11. Referring to FIGS. 3-5, the cover 35 can be attached to the underside 18 of the cutter housing 11 utilizing one or more attachment elements 45. Each attachment element 45 can include a tab or finger 46 that extends inwardly from a remainder of the cover 35. The tab 46 can include a bore or hole 47. Referring to FIG. 2, a fastener 48 can be positioned through the bore 47 and extend into a boss, for example, in the cutter housing 11. However, it is appreciated that other mechanical attachment assemblies can be utilized so as to attach the cover 35 to the underside 18 of the cutter housing 11. In the exemplary embodiment of FIGS. 1-10, the cover 35 can share mounting points with the prime mover 12. For example, each of the fasteners 48 can pass through a respective mounting portion of the prime mover 12 and the respective hole 47 of the cover 35.

As illustrated in FIG. 2, the cover 35 can support the shutter 80 so that the shutter 80 can rotated between the first shutter position 84 and the second shutter position 85. Such rotational movement can be can be less than a full rotation of the shutter 80 such that the shutter 80 travels along an arc of a circle. More specifically, the cover 35 can rotatably support the shutter 80 such that the shutter 80 rotates in a concentric manner about the cover 35. As described in detail below, the shutter 80 can be provided with a shutter collar 90 that slidably mates with a cover collar 50 of the cover 35. Such arrangement provides for the shutter 80 to rotate or spin about the cover 35.

FIG. 3 is an exploded view showing cover 35 and shutter 80, in accordance with embodiments of the disclosure. The shutter 80 can include a blocking panel 81. Referring to FIG. 2, the blocking panel 81 can rotate from the first shutter position 84 in which the discharge opening is opened by the blocking panel 81 to a second shutter position 85 in which the discharge opening is closed by the blocking panel 81. The blocking panel 81 can vary in shape and size dependent on particular attributes of the lawnmower in which the shutter assembly is to be utilized. The blocking panel 81 can include, for example, a horizontal portion 82. Also, the blocking panel 81 can include a vertical portion 83. However, the particular arrangement of the portions 82, 83 are merely illustrative. The blocking panel 81 can be constructed only of a vertical portion. The blocking panel 81 can be constructed only of a horizontal portion. In other embodiments, the blocking panel 81 can be constructed of intermittent horizontal portions and vertical portions. As shown in FIG. 3, the blocking panel 81 can be provided with reinforcing ridges or flanges so as to provide structural strength to the blocking panel 81.

The shutter 80 can also include a shutter collar 90. The blocking panel 81 can be attached to and along an outer wall 94 of the shutter collar 90. Specifically, the blocking panel 81 can be attached to an outer lower edge 96 of the shutter collar 90.

Figure 6:
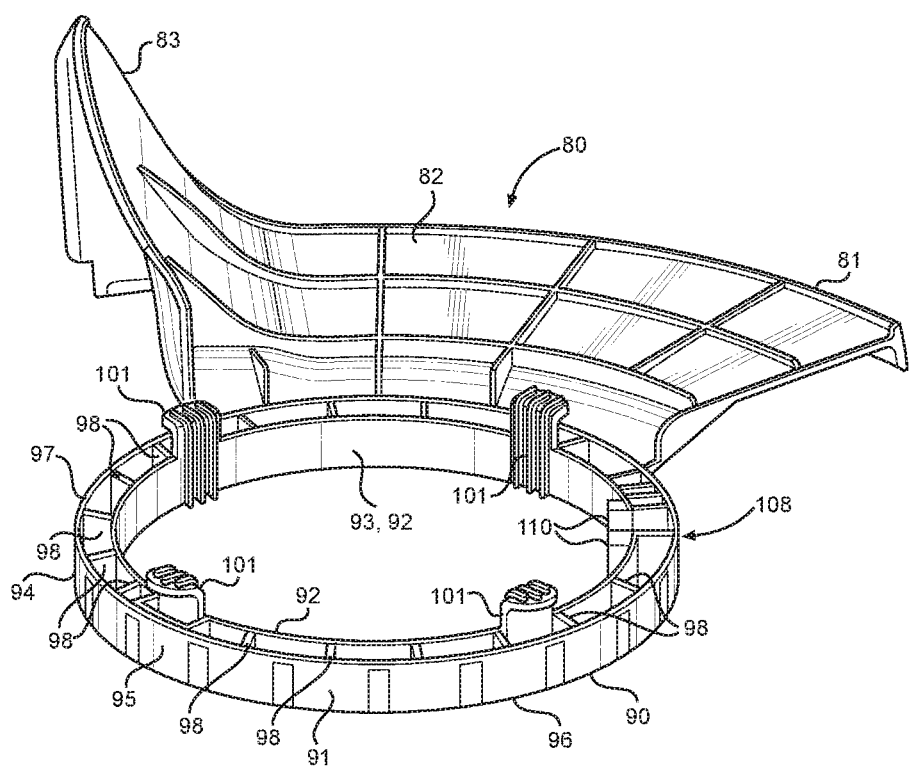
FIG. 6 is a perspective view of the shutter of the shutter assembly of FIG. 2.

The shutter 80 can be rotatably housed within or about the cover 35. In particular, the shutter 80 can include a plurality of shutter support members 101, as shown in FIGS. 3, 4 and 6. The shutter support members 101 can be spaced about the shutter 80. In particular, the shutter support members 101 can be spaced about an inner circumference of the shutter collar 90, for example. The shutter support members 101 can engage with and be supported by an inner circular flange 60 of the cover 35. Further details are described below.

As shown in FIGS. 3-5, the cover 35 includes the attachment element 45. It is the attachment element 45 that attaches or secures the cover 35 to the underside 18 of the cutter housing 11. The cover 35 can include a panel 36. The panel 36 can include a horizontal portion 38 and a vertical portion 39. As shown, a shape of the panel 36 can substantially match with a shape of the blocking panel 81. However, in other embodiments the shape of the panel 36 can be different as compared to the shape of the blocking panel 81. In other embodiments, the panel 36 can be omitted. In the exemplary embodiment of the cutter housing 11, the top wall 21 can rise in elevation at a rear portion of the cutter housing 12 that is between the prime mover 12 and the collection bag 12 such that the inner surface is spaced well above the cutting plane of the blade(s). The panel 36 can form a ceiling of the cutting chamber 32 along the rear portion of the cutter housing 11. That is, the panel 36 can separate the cutting chamber 32 from a volume above the cutting chamber 32 and the below the inner surface of the top wall 21.

FIG. 4 is a perspective view of the cover 35 attached to the shutter 80, in accordance with one or more embodiments. As shown in FIG. 4, the blocking panel 81 is in a first shutter position in which the discharge opening 15 of the cutter housing 11 would be opened. In the arrangement of FIG. 4, the blocking panel 81 is nested with the panel 36. In other words, the blocking panel 81 can lay against and at least in partial contact with the panel 36 so that the blocking panel 81 obstructs or minimizes vegetation clippings from entering a space between the blocking panel 81 and the panel 38 when the shutter 80 is in the discharging position.

The cover 35 can rotatably support the shutter 80. As described above, the shutter 80 can include a plurality of shutter support members 101. The cover 35 can include a cover collar 50 on which is mounted an inner circular flange 60. The shutter support members 101 can engage with the inner circular flange 60. More specifically, the shutter support members 101 can be supported by the inner circular flange 60 such that the shutter support members 101 can slide along the inner circular flange 60. As a result, rotational movement of the shutter 80 can be provided within the cover 35. The shutter 80 can be otherwise attached to the cover 35. The shutter 80 can include the shutter collar 90. The shutter collar 90 can include a shutter collar top or top surface 97. The shutter collar top surface 97 can provide a seating surface or engagement surface that engages with a lower surface of the inner circular flange 60. Accordingly, the inner circular flange 60 can effectively be "sandwiched" between the shutter collar top surface 97 and the shutter support member 101. Further, the shutter support member 101 can engage with flange inner edge 62 of the inner circular flange 60. Engagement of the shutter support number 101 with the flange inner edge 62 can serve to center the shutter 80 during rotation. Accordingly, the arrangement shown in FIG. 4 can provide an effective, stable, and durable arrangement to provide rotation to the shutter 80.

As shown in FIGS. 3-5, the cover 35 can be provided with one or more flange notches 64. In at least some embodiments of the disclosure, the flange notch 64 can be provided in the inner circular flange 60 so as to assist in assembly of the shutter 82 the cover 35. For example, the shutter support member 101 inserted into the notch 64 and then the shutter 80 rotated relative to the cover 35. In this manner, the shutter support member 101 can be engaged or positioned on the inner circular flange 60 so as to be disposed in the operational arrangement as shown in FIG. 4. Each of the notches 64 can be positioned so as to not interfere with normal operation of the shutter 80 supported in the cover 35. In particular, location of each of the notches can be "outside" of the travel of the shutter support member 101 (on the inner circular flange 60) during normal operation of the shutter assembly 20. In at least some embodiments of the disclosure, the notches 64 can be omitted.

FIGS. 3-5 also show attachment elements 45. As described above, the attachment elements 45, which can include or be in the form of the tab, can be used to attach the cover 35 to the underside 18 of the cutter housing 11. Accordingly, the shutter 80 is rotatably supported within the cutter housing 11 so as to be rotatable between a first shutter position (in which a discharge opening of the lawnmower is opened) and a second shutter position (in which the discharge opening of the lawnmower is closed). The shutter 80 can be moved into or from such positions utilizing the lever 115. The lever 115 can be attached, at a lower end of the lever 115, in a manner as described further below. As shown in FIGS. 3-5, each of the cover 35, the shutter 80, and components thereof can be provided with reinforcing ridges, flanges or other structure so as to provide structural strength to the particular component.

As shown in FIG. 5, the cover collar 50 can be in the form of a segment of a sleeve or cylinder, for example. The cover collar 50 can include a wall 51 that constitutes or includes the sleeve or cylinder. The wall 51 of the cover collar can include an inner wall 52 and an outer wall 54. The inner wall 52 can include an inner wall surface 53. The outer wall 54 can include an outer wall surface 55. Additionally, the cover collar 50 can include inner connecting ribs 57. The inner connecting ribs 57 can extend between the inner wall 52 and the outer wall 54. The inner connecting ribs 57 in conjunction with the walls 52, 54 can provide structural strength to the cover 35.

As shown in FIG. 5, the inner circular flange 60 can include one or more flange notches 64. As described above, the flange notches 64 can assist with or be utilized in assembly of the shutter assembly 20. Accordingly, each of the flange notches 64 can be characterized as demarcating or separating a series of inner circular flange portions 63. In operation of the shutter 80, each of the shutter support members 101 can "ride on" one of the inner circular flange portions 63. Accordingly, arrangement of the operation can be provided such that a shutter support member 101 does not go over or transverse a flange notch 64.

As shown in FIG. 5, the inner circular flange 60 can include an upper circular flange surface 65 and a lower circular flange surface 66. As described above, the upper circular flange surface 65 can provide a slide surface for shutter support members 101. The lower circular flange surface 66 can provide a slide surface for shutter collar top surface 97 of the shutter collar 90.

The cover 35 can also include cover slot 68. The cover slot 68 can include a first end 70 and a second end 71. Additionally, the cover slot 68 can include inner wall 73 and outer wall 74. The cover slot 68 can house the lever 115. More specifically, the lever 115 can be attached to the shutter 80, extend through the cover slot 68, and extend upwardly through the cutter housing slot 27 of the cutter housing 11. In this manner, a user can effect rotational movement of the shutter 80 that is housed within the cover 35. Accordingly, the user can move the shutter 80 between a mulching position and a bagging position. Additionally, the user can move the shutter 80 to interim positions as may be desired. Relatedly, it is appreciated that the position of the first end 70 and the position of the second end 71 can limit arcuate travel of the lever 115. Accordingly, position and length of the cover slot 68 can be at least equal to an amount of travel of the handle 115 that is allotted by the cover housing slot 27. Stability and feel, of manipulation of the lever 115, can be enhanced if the lever 115 reaches respective ends of the cover slot 68 and the cutter housing slot 27 at the same time, i.e. at the same point in arcuate travel of the lever 115.

FIG. 6 is a top perspective view of the shutter 80 in accordance with one or more embodiments of the disclosure. Hereinafter, further aspects and features of the shutter 80 will be described.

The shutter collar 90 can include wall 91. The wall 91 can include an inner wall 92 and an outer wall 94. The inner wall 92 can include an inner wall surface 93. The outer wall 94 can include an outer wall surface 95. The inner wall 92 can be connected to the outer wall 94 using inner connecting ribs 98. Such double wall construction including inner connecting ribs 98 can provide rugged and durable construction so as to effectively support the blocking panel 81. As described above, the shutter collar 90 can also include an outer lower edge 96 of the shutter collar 90. The blocking panel 81 can be attached at or proximate to a segment of the outer lower edge 96.

As shown in FIG. 6, the shutter collar 90 can include an attachment portion 108. The attachment portion 108 provides structure to attach or receive lever 115. The attachment portion 108 can include a pair of support ribs 110. An attachment end or attachment portion 116 of lever 115 can be received into or between the support ribs 110. In other words, attachment portion 116 can be nested between the support ribs 110. The support ribs 110 can engage with sides of attachment portion 116 (of lever 115) so as to securely retain and prevent rotation of the lever 115 relative to the shutter collar 90. The shutter collar 90 can be reinforced with additional inner flanges, supports, or other reinforcing structure so as to provide structural strength to the shutter collar 90, at point of attachment of the lever 115. The lever 115 and the shutter collar 90 can both be provided with one or more apertures so as to receive connecting fasteners. Such connecting fasteners can be used to connect lever 115 to the shutter collar 90. For example, FIGS. 2 and 5 show an exemplary fastener that can include a threaded bolt 127. Referring to FIG. 5, the fastener can include a threaded nut 128. However, it is appreciated that other fastener structure or assemblies can be used in the alternative. One or more fasteners can be used to attach the lever 115 to the shutter collar 90. Thus, the lever 115 can be directly connected to the shutter 80. Further, the lever 115 can be fixed relative to the shutter 80.

Figure 7:
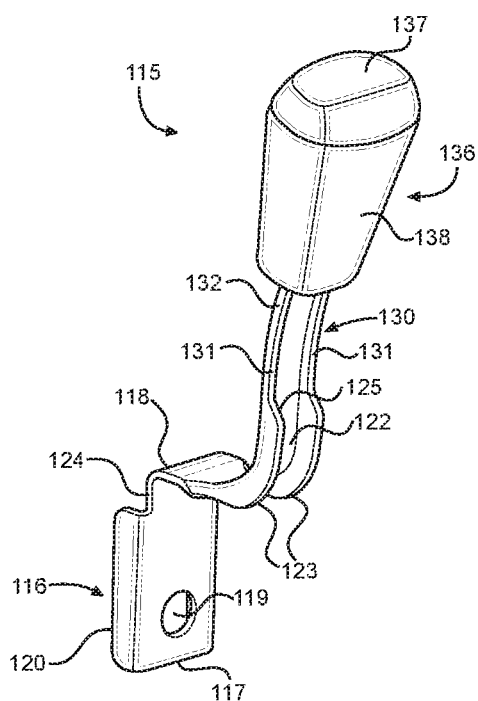
FIG. 7 is a perspective view of the lever to move a shutter of the shutter assembly of FIG. 2.

FIG. 7 is a perspective view of lever 115, in accordance with one or more embodiments of the disclosure. As shown, the lever 115 can include the attachment portion 116, an elbow member 122, and an engagement arm 130 and a grip 136.

The attachment portion 116 can include plate 117. Plate 117 can be received into and attached to the attachment portion 108 of the shutter collar 90. An upper and of the attachment portion 116 can include a bend 118. The attachment portion 116 can be connected to the elbow member 122 at the bend 118. The attachment 116 can also include an aperture 119. The aperture 119 can receive a fastener so as to connect to the attachment portion 108 of the shutter collar. The attachment portion 116 can also include one or more orientation flanges 120. The orientation flanges 120 can extend on opposing sides of the plate 117. The orientation flanges 120 can engage with or nest with support ribs 110 of the attachment portion 108. Accordingly, the orientation flanges 120 can also prevent rotation of the lever 115 at the attachment point to the shutter collar 90. Further, the orientation flanges 120 can increase the bending strength of the plate 117.

The elbow member 122 can include a lower elbow end 124 and an upper elbow end 125. The lower elbow end 124 can be connected to the attachment portion 116. The upper elbow end 125 can be attached to the engagement arm 130. The elbow member 122 can also include opposing elbow side flanges 123. The side flanges 123 can provide structural support to the lever 115. However, the structure of the handle 115, including the junction of the attachment portion 116 to the elbow member 122, can provide a degree of flexibility to the lever 115.

The engagement arm 130 can extend upwardly from elbow member 122 so as to extend through cutter housing slot 27 and to extend above the cutter housing 11. Accordingly, such arrangement provides for the lever 115 to be accessible to a user such that a user can manipulate the lever 115 to a position as desired. In particular, the user can manipulate the lever 115 between a mulching position and a bagging position.

The engagement arm 130 can include an upper end 132 attached to the elbow member 122. The upper end 132 of the engagement arm 130 can be provided with a grip 136. The engagement arm 130 can be provided with engagement lever side flanges 131. The engagement lever side flanges can provide structural support to the lever 115. Each of the attachment portion 116, the elbow member 122, in the engagement arm 130 can include side reinforcing flanges and/or be constructed in a U-shape for structural strength.

The grip 136 can include a grip upper portion 137 and a grip lower portion 138. For example, the grip lower portion 138 can enclose the upper end 132 of the engagement arm 130. The grip upper portion 137 can "cap off" a top of the lever 115. The grip 136, including the grip upper portion 137 and the grip lower portion 138 can be attached either through adhesive, interlock, locking tab, or frictional fit, for example. Accordingly, the grip 136 provides an effective structure for a user to grasp and manipulate.

FIG. 8 is an upper sectional view of cutter housing 11, in accordance with one or more embodiments. In particular, FIG. 8 shows cutter housing slot 27. As otherwise described herein, cutter housing slot 27 can accommodate lever 115. As shown, cutter housing slot 27 can be in an arcuate shape so as to correspond to the arcuate travel path of the lever 115, as supported by the shutter collar 90. The length of the cutter housing slot 27 can vary dependent on travel distance required of the shutter 80, i.e. travel distance so as to move the shutter 80 from a full mulching position to a full bagging position. Referring to FIG. 2, the arcuate cutter housing slot 27 can conform to an arc of a circle with a center A. The center A can also be an axis of rotation of the shutter 80. The center A can also be an axis of rotation of the driveshaft of the prime mover 12. The center A can also be the axis of rotation of the blade(s). That is, the cutter housing slot 27 can be concentric with the shutter collar 90, and can be concentric with the arcuate path of travel of the blocking panel 81.

In view of the description above and FIGS. 1-9, the cutter housing slot 27 can be configured to limit movement of the lever 115 such that the range of motion of the blocking panel 81 extends from the first shutter position 84 (also referred to as a discharge position) to the second shutter position 85 (also referred to as a mulching position) without any further elements, structures, assemblies, etc.

The shutter assembly of the disclosure can provide a high performing and durable assembly that can be used with a variety of cutter housings. For example, the shutter assembly of the disclosure can provide a high performing rotational shutter assembly to a steel cutter housing or deck. Accordingly, when implementing a stamped slot shape in a steel cutter housing, the disclosed subject matter can provide a simple, low cost, rotational shutter assembly as described above. Side to side rotation of the shutter, between a mulching position and a discharging position, can be limited by contact of the lever to the respective ends of the stamped cutter housing slot.

Figure 10:
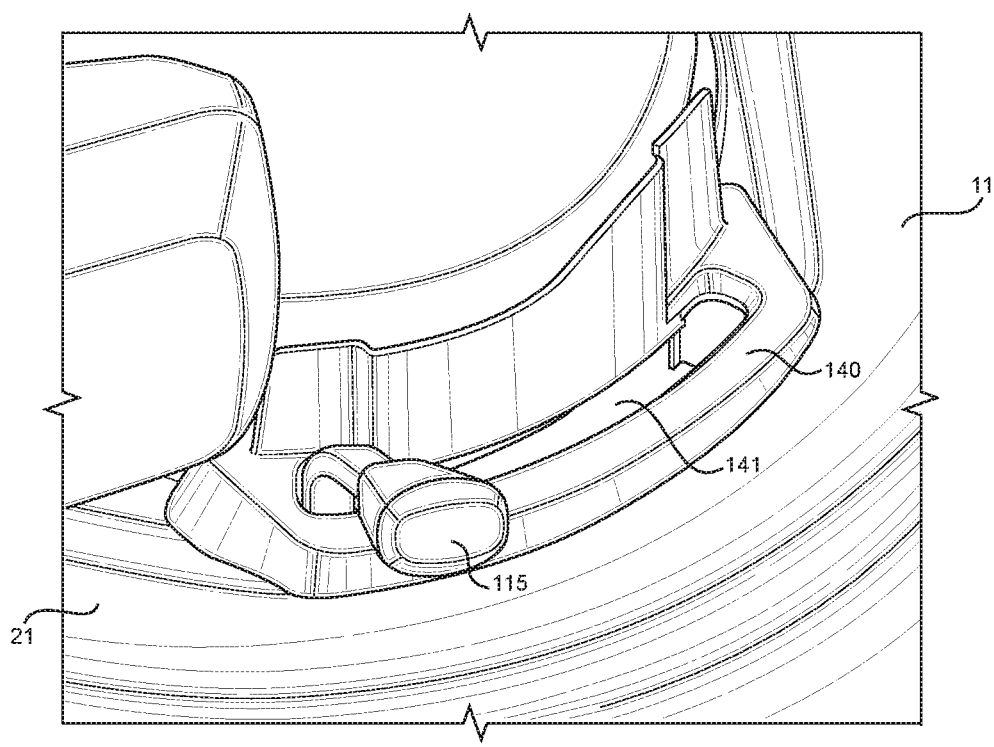
FIG. 10 is a top view of a portion of a cutter housing showing an alternate embodiment of the shutter assembly for the lawnmower of FIG. 1.

FIG. 10 is a top view of a portion of the cutter housing 11 showing an alternate embodiment of the shutter assembly 20. The shutter assembly 20 can include all of the features of the shutter assembly 20 described above with respect to FIGS. 1-9. The shutter assembly 20 can further include a housing insert or cover 140 with insert slot 141. The housing insert 140 can cover cutter housing slot 27, and can provide a predetermined aesthetic appearance around the cutter housing slot. Accordingly, in some embodiments of the disclosure, cutter housing slot 27 can be provided with contoured and finished edges so as to provide the cutter housing slot 27 with a pleasing appearance. In other embodiments, the cutter housing slot 27 can be left in a "rougher" appearance and housing insert 140 can be provided to cover the cutter housing slot 27. The housing insert 140 can be connected or attached to the cutter housing 11 utilizing suitable fasteners or by other mechanical assembly.

Figure 11:
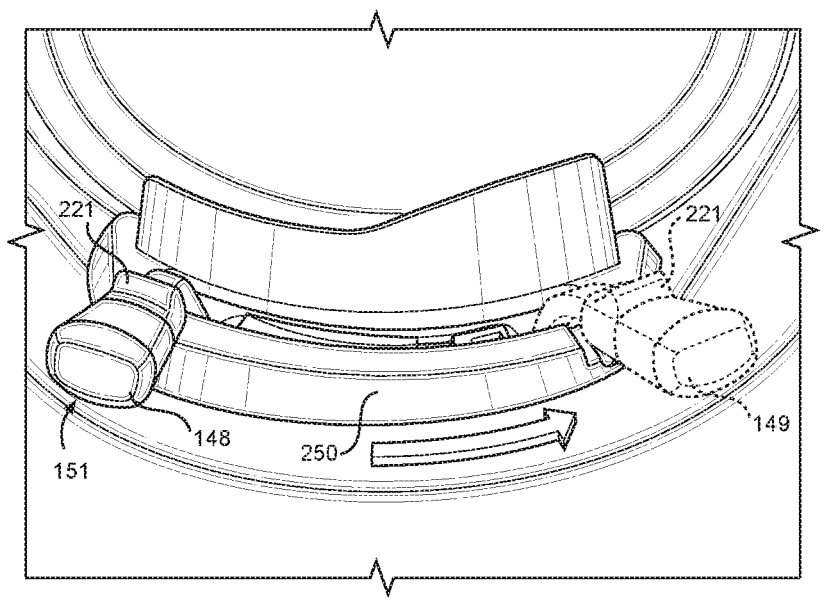
FIG. 11 is a top view of a portion of the cutter housing with cover and lever showing an alternate embodiment of a shutter assembly of the disclosure that includes a shutter locking assembly.
Figure 12:
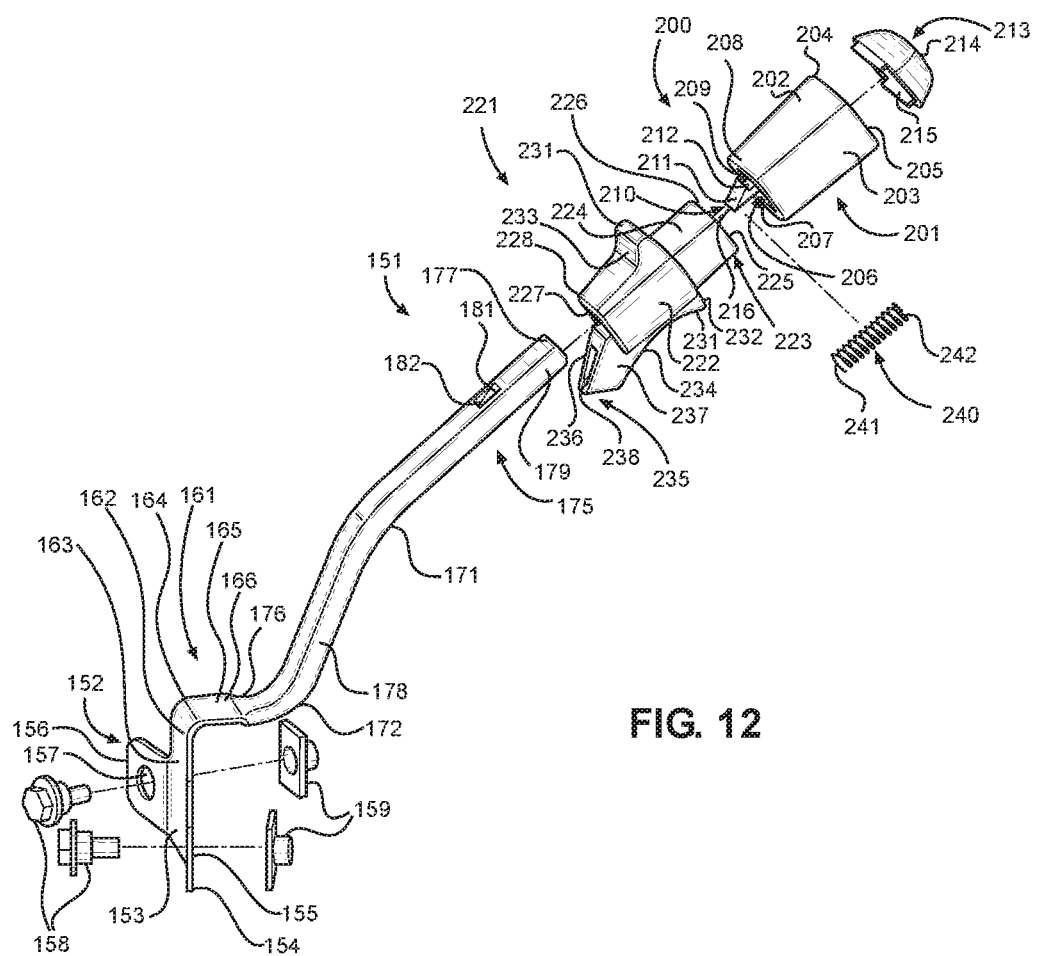
FIG. 12 is a perspective view of a lever the same as or similar to the lever of FIG. 11, in accordance with at least one embodiment of the disclosure.
Figure 13:
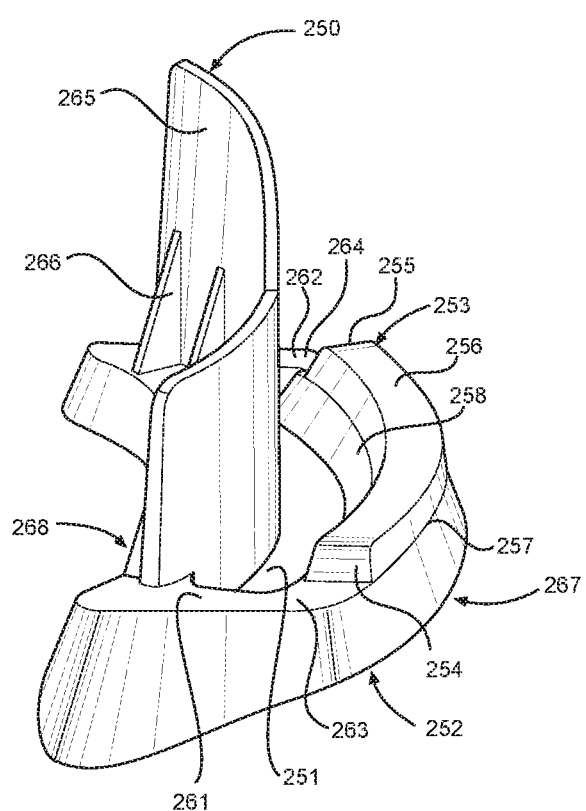
FIG. 13 is a perspective view of a cover, in accordance with at least one embodiment of the disclosure.

FIG. 11 is a top view of a portion of the cutter housing showing an alternate embodiment of a shutter assembly of the disclosure that can include a shutter locking assembly. FIGS. 12 and 13 show additional details of the shutter assembly of FIG. 11. The shutter assembly of FIGS. 11-13 can include all of the features described above with respect to FIGS. 1-9, except the structure of the lever and related structure can be varied.

The shutter assembly can include a shutter locking assembly that includes a lever 151 and cover 250. The lever 151 can be attached to a shutter 80, which possesses structure as described above. The lever 151 can extend through the cutter housing slot 27. The lever 151 can be engageable by a user so as to move the shutter 80 between a first shutter position and a second shutter position. As described above, in the first shutter position the blocking panel 81 is positioned such that the blocking panel 81 opens the discharge chute 15 to the cutting chamber 32 of the lawnmower 10. In the second shutter position, the blocking panel 81 is positioned such that the blocking panel closes the discharge chute 15 from the cutting chamber 32. The second shutter position can correspond to a mulching position. Referring to FIG. 12, the lever 151 can include a handle knob assembly 200. The handle knob assembly 200 can include a button 221 that is biased by a spring 240 to lock the lever in various positions on the mower deck.

Referring to FIG. 11, the various positions on the mower deck 11 can include a first lever lock position 148 and a second lever lock position 149. The first lever lock position 148 can correspond to the shutter 80 being in the first shutter position 84 of FIG. 2. This can allow cut clippings to be discharged through the discharge opening 25 of the lawnmower 10. The second lever lock position 149 can correspond to the shutter 80 being in the second shutter position 85 of FIG. 2. This can allow mulching of the cut clippings.

Referring to FIG. 12, the lever 151 can include an engagement arm 175. The button 221 can be slidable along the engagement arm 175 and specifically along an upper engagement arm portion 179. The button 221 can be slidable along the engagement arm 175 so as to move or slide from a locked position to an unlocked position. In the locked position, the lever 151 can be locked in one of the various positions as desired. In the unlocked position, the lever 151 can be free to move between the various positions. Through manual manipulation of the lever 151, a user may move the lever 151 from a first locked position to a second locked position. In particular, through manual manipulation of the lever 151, a user may move the lever 151 from a clippings discharge position to a mulching position, for example.

Referring to FIGS. 8, 11 and 13, the shutter assembly can further include the cover 250. The cover 250 can be provided about and/or over the cutter housing slot 27. The cover 250 can include a first engagement face 254 that engages the button 221 when the lever 151 is in the first lever lock position 148. The cover 250 can include a second engagement face 255 when the lever is in the second lever lock position 149.

Referring to FIG. 12, the button 221 can include a wedge tab 235. The wedge tab 235 can include a first wedge surface 236 and a second wedge surface 237. In accordance with embodiments of the invention, it can be the wedge tab 235, of the button 221, that engages with the first engagement face 254 and the second engagement face 255. Specifically, the first wedge surface 236 can engage with the first engagement face 254 to lock the lever 151 so as to position the shutter 80 in the first shutter position 84 of FIG. 2. Further, the second wedge surface 237, of the wedge tab 235, can engage with the second engagement face 255 to lock the lever 151 so as to position the shutter 80 in the second shutter position 85 of FIG. 2, i.e., in the mulching position.

The wedge tab 235 can extend from a button body 222 of the button 221. The wedge tab 235 can be in the form of a wedge. Specifically, the first wedge surface 236 and the second wedge surface 237 can be angled relative to each other. Such wedge surfaces 236, 237 can be angled such that the wedge surfaces are further apart at a top portion of the wedge tab then at a bottom portion. Relatedly, the first engagement face 254 of the cover 250 can be an inclined surface. Additionally, the second engagement face 255 of the cover 250 can be an inclined surface. As a result, the first engagement face 254 can wedge with the first wedge surface 236, of the wedge tab 235, as a result of the bias of spring 240 alone, or in combination with gravity, acting upon the button 221. Accordingly, the lever 151 can be "locked" into the first lever lock position 148.

Alternatively, the lever 151 can be "locked" into the second lever lock position 149. In the second lever lock position 149, the second engagement face 255 can wedge with the second wedge surface 237, of the wedge tab 235, as a result of both the bias of spring 240 alone, or in combination with gravity, acting upon the button 221.

As described above, the first wedge surface 236 can be angled relative to the second wedge surface 237. The particular amount or degree that the surfaces 236, 237 are angled relative to each other can be varied as desired. For example, the surfaces 236, 237 can be set at a predetermined angle relative to each other that can provide an engagement/disengagement force that can be favorably perceived by the user when the first and second surfaces 236, 237 engage/disengage the first and second engagement faces 254, 255. However, the disclosure is not limited to such angles. Other angles may be utilized as may be desired. Relatedly, the angle of the first engagement face 254 and the second engagement face 255 can be varied as desired.

FIG. 13 is a perspective view of a cover 250, in accordance with at least one embodiment of the disclosure. As shown in FIG. 13, the cover can include a base portion 252. The base portion 252 can include a slot 251. The slot 251 can be arcuate in shape so as to allow movement of the lever 151 between the first lever lock position and the second lever lock position, for example. The slot 251 can be complimentary in shape to the cutter housing slot 27, For example, each the slot 251 and the cutter housing slot 27 can be an arc of a respective circle having a center that is concentric with the center of rotation A of the shutter 80. The slot 251 can be in communication with the cutter housing slot 27. As shown in FIG. 13, the base portion 252 can be taller in profile at the ends of the base portion 252 then in the middle of the base portion 252. In other words, the base portion 252 can "dip" in a middle region of the base portion 252. A shoulder 253 can extend along such middle region of the base portion 252. The shoulder 253 can include first and second ends. The first end of the shoulder 253 can constitute the first engagement face 254. The second end of the shoulder 253 can constitute the second engagement face 255.

The shoulder 253 can include a top slide face 256. The top slide face 256 can run along the slot 251. In operation, the wedge tab 235, with user manipulation, can slide along the top slide face 256 when the lever 151 moves between the first lever lock position 148 and the second lever lock position 149. The top slide face 256 can be substantially horizontal.

The shoulder 253, as shown in FIG. 13, can run along the slot 251 on an outer or outboard portion 267 of the base portion 252. The base portion 252 can also include an inboard portion 268. Both the outboard portion 267 and the inboard portion 268 can run along the length of slot 251 so as to define the slot 251. The inboard portion 268 can include a shield 265. The shield 265 can extend in a curved or arcuate manner along the length of slot 251. The shield 265 can be reinforced by reinforcement flanges 266. The shield 265 can be of shape and dimension, including height, as desired. The shield 265 can shield the cover 250 and/or the lever 151 from heat generated by the prime mover 12, such as a combustion engine, for example.

The shoulder can run along the slot 251 as described above, the shoulder 253 can be disposed in the "dip" of the middle region of the base portion 252. Accordingly, the shoulder 253, in combination with the middle "dip" of the base portion, can effectively form recesses at opposing ends of the shoulder 253. These recesses can accept or house the spring actuated button 221. More specifically, these recesses can accept or house the wedge tab 235 of the button 221. Such recesses can include a first recess 263 and a second recess 264. The first recess 263 can form or be a part of a first engagement surface 261 of the base portion 252. The second recess 264 can form or be a part of a second engagement surface 262 of the base portion 252.

In embodiments of the disclosure, the shoulder 253 can be integrally formed with the base portion 252. In embodiments of the disclosure, the shoulder 253 can be separately formed from the base portion 252 and attached with each other, such as but not limited to adhesive or heat bonding or mechanical fasteners. Whether the base portion 252 and the shoulder 253 are integrally formed or separately formed, the base portion 252 and shoulder 253 can be demarcated or separated by a join line 257. As shown in FIG. 13, the cover 250 can include an angled slide face 258. The angled slide face 258 can be constituted or include inboard sides of both the shoulder 253 and the base portion 252. The angled slide face 258 can be contoured and smooth in construct so as to be conducive to the lever 151 sliding along the angled slide face 258, i.e., in conjunction with the user moving the lever 151 from a mulching position to a discharge position, for example.

Referring to FIG. 12, the handle knob assembly 200, of the shutter assembly, can include spring actuated button 221 as described above. The handle knob assembly 200 can also include a shutter lever knob 201. The shutter lever knob 201 can be provided at an upper end of the lever 151. More specifically, the shutter lever knob 201 can be provided on an upper end 177 of the engagement arm 175 of the lever 151. The shutter lever knob 201 can be configured to be grasped by a user along with the button 221 so as to manipulate the shutter 80, such as between a mulching position and a discharge position. The shutter lever knob 201 can include knob body 202. The engagement arm 175, and specifically an upper end 177 of the engagement arm 175, can extend through the knob body 202.

As shown in FIG. 12, the button 221 can include button body 222. The engagement arm 175 can also extend through the button body 222. A slide sleeve 223 can extend upwardly from the button body 222. The slide sleeve 223 can include an outer surface that constitutes a button slide surface 224. The button slide surface 224 can be cylindrical, square, rectangular, or other shape on an outer diameter of the slide sleeve 223. As described below, the slide sleeve 223 with button slide surface 224 can slidably or telescopically engage with the shutter lever knob 201.

The button 221 can include an interior space through which the upper engagement arm portion 179, of the engagement arm 175, passes. The interior space of the button 221 can include a button upper interior space 225 that is provided within the slide sleeve 223. The interior space of the button 221 can include a button lower interior space 227 that is provided within the button body 222. The interior spaces 225, 227 can collectively form an interior space of the button 221. At a top end of the button 221, the slide sleeve 223 can include an upper opening 226. At a bottom end of the button 221, the button body 222 can include a lower opening 228.

As described above, the handle knob assembly 200 can include the shutter lever knob 201. The shutter lever knob 201 can include knob body 202. The knob body 202 can include a knob outer surface 203. The knob body 202 can include a knob upper end 204 that includes a knob upper opening 205. The knob body 202 can include a knob lower end 208 that includes a knob lower opening 209. The knob body 202 can also include a knob interior 206. The knob interior 206 can be accessed through the knob lower end 208.

The knob interior 206 can include an interior surface that can function as a knob slide surface 207. The knob slide surface 207, can be cylindrical, square, rectangular, or other shape on an inner diameter or surface of the knob body. The knob slide surface 207, an interior surface, can correspond to the button slide surface, an outer surface, and the outer perimeter (OP) of the button slide surface 224 can be slightly smaller than the inner perimeter (IP) of the knob slide surface 207. Accordingly, the button slide surface 224 can be slidably received within the knob slide surface 207. In particular, this arrangement of the button 221 being slidably positioned within the knob body 202 allows the button 221 to slide up and down between a locked position and an unlocked position. The button 221 can be constrained in travel (up and down) by position of the shutter lever knob 201 (at a top end of travel) and engagement of the button 221 with the cover 250 (a lower end of travel of the button 221).

The button 221 can be biased away from the shutter lever knob 201, i.e., the button 221 can be biased in a downward direction towards the cover 250, by a mechanical biasing mechanism. Illustratively, the mechanical biasing mechanism can be a spring 240. The spring 240 can include a lower end 241 and an upper end 242. The spring lower end 241 can be received into the button 221. The spring upper and 242 can be received into the shutter lever knob 201. The shutter lever knob 201 can include a bore, partition, or other support device so as to support the spring 240 at a desired orientation, such as parallel to the upper engagement arm portion 179. The button 221 can include a bore, partition, or other support device so as to support the lower end of the spring 240 at a desired orientation, such as parallel to the upper engagement arm portion 179.

The shutter lever knob 201 can be statically attached to the engagement arm 175, and specifically the upper engagement arm portion 179, such that movement between the shutter lever knob 201 and the engagement arm 175 can be prevented. In accordance with one embodiment of the invention, the shutter lever knob 201 can include a prong 210 that extends out from the knob interior 206. An upper end of the prong 210 can be attached to a structure within the knob interior 206. Accordingly, the prong 210 can be received into the interior space 225, 227 of the button 221 in conjunction with the button slide surface 224 being slidably received within the knob slide surface 207. The prong 210 can include an angled surface 211 and a notch or recessed portion 212. In other words, the prong 210 can include a snap engagement tip 216.

Relatedly, the upper engagement arm portion 179 can be constructed in a U-shape such as by a metal stamping process. The upper engagement arm portion 179 can include a recessed portion 181. The recessed portion 181 can be provided in a stamping process and/or in a "punching" process in which the upper engagement arm portion 179 is punched so as to form the recessed portion 181. Accordingly, the recessed portion 181 can be constituted by or include a portion of metal that is punched out of an upper surface of the upper engagement arm portion 179. The punched material can maintain connection at an upper end of the recessed portion 181, but be bent down at an angle so as to form an interior ridge 182 within an interior of the U-shaped upper engagement arm portion 179. The snap engagement tip 216 can be received into the U-shaped upper engagement arm portion 179 so as to "snap" into engagement with the interior ridge 182. As a result, the shutter lever knob 201 can be secured onto the upper engagement arm portion 179 with the button 221 positioned between the shutter lever knob 201 and the cover 250.

The disclosure is not limited to the particular arrangement of the recessed portion 181 and interior ridge 182 or to the particular arrangement of the snap engagement tip 216. For example, other arrangements in lieu of the recessed portion 181 can be provided so as to engage with the snap engagement tip 216 and/or to secure the shutter lever knob 201 onto the engagement arm 175.

As described above, the handle knob assembly 200 can include a shutter lever knob 201 that is provided at an upper end of the engagement arm 175 above the button 221. The shutter lever knob 201 can be configured to be grasped by a user along with the button 221 so as to manipulate the shutter 80. In addition to the knob body 202, the shutter lever knob 201 can also include a knob cap 213. The knob cap 213 can include a rounded engagement surface 214 that is conducive and pleasing to be grasped by a user, along with the knob body 202. The knob 213 can include a cap seating shoulder 215 that can be received into or engage with the knob upper opening 205.

As otherwise described herein, the handle knob assembly 200 can include shutter lever knob 201 and button 221. A user can manipulate the button 221 so as to push the button 221 upwards, along engagement arm 175, towards the shutter lever knob 201 and so that the button 221 is received into the shutter lever knob 201. Such manipulation serves to disengage or unlock the button 221 relative to the cover 250. In general, the shutter lever knob 201 and the button 221 can be shaped and configured to assist in such manipulation by the user. The button 221 can include a pair of engagement ridges 231 on opposing sides of the button 221. The engagement ridges 231 can be in the form of a ridge or protuberance that extends outwardly to enhance ease of manipulation by a user. The engagement ridges 231 can extend across a width or a portion of the width of the button 221. The engagement ridges 231 can be of construct conducive to engagement with the hand or fingers of the user. The engagement ridge 231 on the upper side of the button 221 as viewed in FIG. 12 can be complemented by a ridge concave surface 233. The button 221 can also include a lower back surface 234 that can compliment the engagement ridge 231 on the lower side of the button 221 as viewed in FIGS. 12. The lower back surface 234 can be concave in construct so as to be conducive to manipulation by a user. For example, the lower back surface 234 and the ridge concave surface 233 can be grasped by the thumb and fingers (of the user) so as to pull or push the button 221 towards the shutter lever knob 201.

The button 221 can also include an engagement surface 232. The engagement surface 232 can be a surface that extends around the slide sleeve 223. The engagement surface 232 can be substantially flat and extend in a direction transverse to a travel direction of the button 221 along the engagement arm 175. The engagement surface 232 can be configured to mate or match with the knob lower end 208. Accordingly, engagement of the engagement surface 232 with the knob lower end 208 can limit or constrain upward travel of the button 221 along the engagement arm 175.

As shown in FIG. 12, the wedge tab 235 of the button 221 can include a recess or divot 238. The recess 238 can provide flexibility to the wedge tab 235 as compared to a construct of the wedge tab 235 being solid. As the recess 238 is increased in size, flexibility of the wedge tab 235 is increased. Such flexibility can assist in engagement of the wedge tab 235 with either the first engagement face 254 or the second engagement face 255 of the cover 250.

Figure 14:
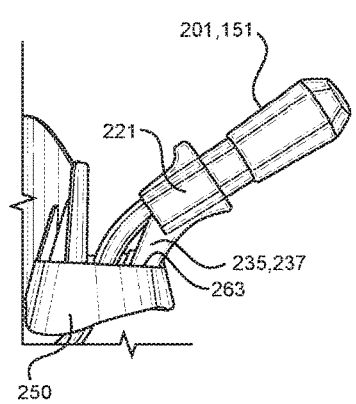
FIG. 14 is a perspective view of the lever in a first lever lock position, which can correspond to a discharge position of the shutter, in accordance with at least one embodiment of the disclosure.
Figure 15:
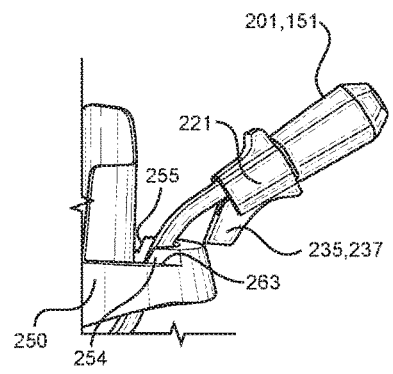
FIG. 15 is a perspective view of the lever in a transitional position, in accordance with at least one embodiment of the disclosure.
Figure 16:
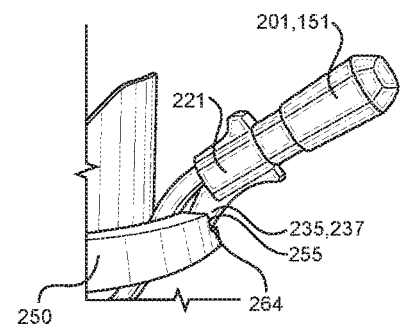
FIG. 16 is a perspective view of the lever in a second lever lock position, which can correspond to a mulching position of the shutter, in accordance with at least one embodiment of the disclosure.

FIGS. 14-16 illustrate a sequence in which the lever 151 is moved from the first lever lock position 148 to the second lever lock position 149. FIG. 14 shows the lever 151 in the first lever lock position 148. In the first lever lock position 148 of FIG. 14, the wedge tab 235 of the button 221 can abut the first recess 263 of the first engagement surface 261 of the cover 250, and the first wedge surface 236 can abut the first engagement face 254 of the cover 250. FIG. 15 shows the lever 151 in a transition position that is between the first lever lock position 148 and the second lever lock position 149. In the transition position of FIG. 15, a user has pulled the button 221 toward the shutter lever knob 201 against the bias of the spring 240 such that the first wedge surface 236 has been disengaged from the first engagement face 254 and the wedge tab 235 is spaced away from or located above the top slide face 256. FIG. 16 shows the lever 151 in the second lever lock position 149. In the second lever lock position 149 of FIG. 16, the wedge tab 235 of the button 221 can abut the second recess 264 of the second engagement surface 262 of the cover 250, and the second wedge surface 237 can abut the second engagement face 255 of the cover 250.

Hereinafter, further features of the lever 151 will be described.

The lever 151 can include an attachment plate 152. The attachment plate 152 can include plate center portion 153. The attachment plate 152 can also include plate side portion 154 and plate side portion 156, which our respectively positioned on opposing sides of the plate center portion 153. The plate side portions 154, 156 can be bent or angled relative to the plate center portion so as to provide an overall curved or concave engagement surface. Such curved or concave engagement surface can be conducive to mating or matching with shutter collar 90 of the shutter 80. The attachment plate 152 can be attached to the shutter 80 such that when the lever 151 is moved, such movement results in movement of the shutter 80, in manner as described above. The attachment plate 152 can be attached to the shutter 80 such as by threaded bolts 158 and threaded nuts 159. In particular, a fastener 158 can pass through an aperture 157 in the plate side portion 156. Although obscured from view in FIG. 12, the plate side portion 154 can include an aperture 155 that is configured like the aperture 157. A fastener 158 can pass through the aperture 155 in the plate side portion 154. Corresponding apertures can be provided in shutter collar 90 of shutter 80 or in other structure of the shutter 80.

The lever 151 can also include an attachment tab 161. The attachment tab 161 can include a vertical portion 162 and a horizontal portion 165. A bend 164 of the attachment tab can connect the vertical portion 162 with the horizontal portion 165. The vertical portion 162, at a lower end thereof, can include a plate attachment end 163. The horizontal portion 165, in an outboard end thereof, can include an arm attachment end 166. The attachment tab 161 can be integrally formed with the rest of the lever 151, such as by a stamping process. The attachment tab 161 can be planar in construct across a width thereof. Such planar construct can provide for limited flexibility of the upper engagement arm portion 179 relative to the attachment plate 152 that can be desired for assembly and manipulation of the lever 151. For example, such flexibility can allow for some variance in position of the slot 251 of the cover 250, as such is assembled on the cutter housing 11, relative to position of the shutter 80.

As shown in FIG. 12, the lever 151 can include an engagement arm 175. Various features of the engagement arm 175 are described above. The engagement arm 175 can be of U-shaped construct and can be constructed through a stamping process of metal, for example. The engagement arm 175 can include an upper engagement arm portion 179 and a lower engagement arm portion 178. The upper engagement arm portion 179 can be substantially straight in construct. The lower engagement arm portion 178 can be bent in construct and possess an "S" shape. In particular, the lower engagement arm portion 178 can include an upper bend 171 and a lower bend 172. The bent construct of the lower engagement arm portion 178 can be conducive to the engagement arm 175 being positioned within and passing through the slot 251 of the cover 250. The engagement arm 175 can include a lower end 176 that is attached to the arm attachment end 166 of the attachment tab 161. The engagement arm 175 can include an upper end 177 that is positioned within the shutter lever knob 201.

Figure 17:
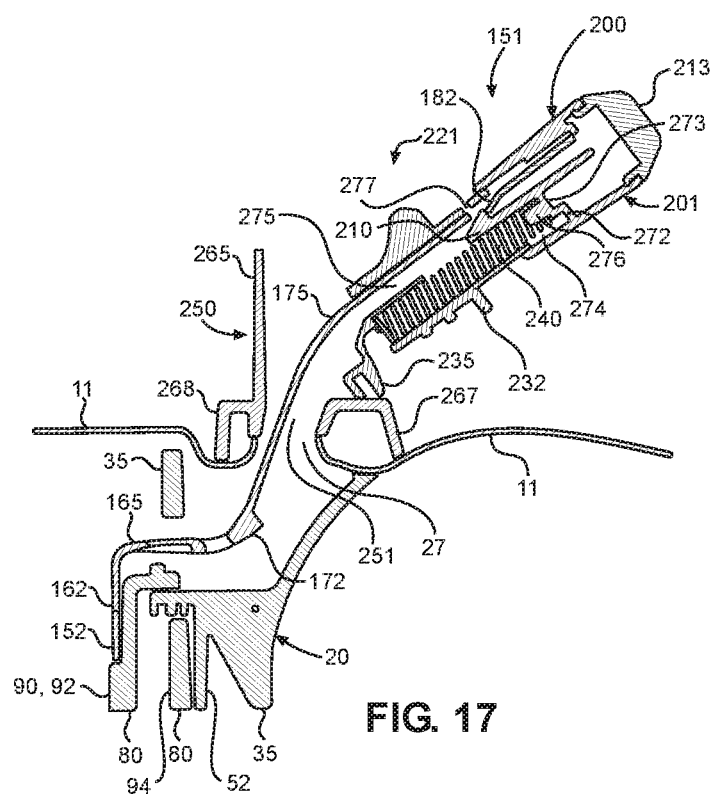
FIG. 17 is a cross-sectional view of a lever with cutter housing and shutter assembly, in accordance with at least one embodiment of the disclosure.

FIG. 17 is a cross-sectional view of a lever 151 with cutter housing 11 and shutter assembly 20, in accordance with at least one embodiment of the disclosure. The shutter assembly 20 can include a cover 35 and a shutter 80. As shown, the lever 151 can extend through a cutter housing slot 27 in the cutter housing 11. As described above, the lever 151 can be attached to the shutter 80 so as to impart rotational movement of the shutter 80 between a discharge position and a mulching position, for example. The lever 181 can include an attachment plate 152, which can be attached to the shutter 80. The attachment plate 152 can be connected to the inner wall 92 of the shutter collar 90. The shutter collar 90 can also include an outer wall 94. The cover 35 can include an inner wall 52, as described above.

The lever 151, and specifically engagement arm 175, can be spatially arranged and configured to pass through cutter housing slot 27 and be connected to the shutter 80. The lever 151, at a lower end thereof, can include a vertical portion 162 and a horizontal portion 165. As described above, the arrangement of FIG. 17 includes a cover 250. The cover 250 can be positioned about the cutter housing slot 27. The cover 250 can include a slot 251. The slot 251 can correspond or match up with the cutter housing slot 27.

Figure 19:
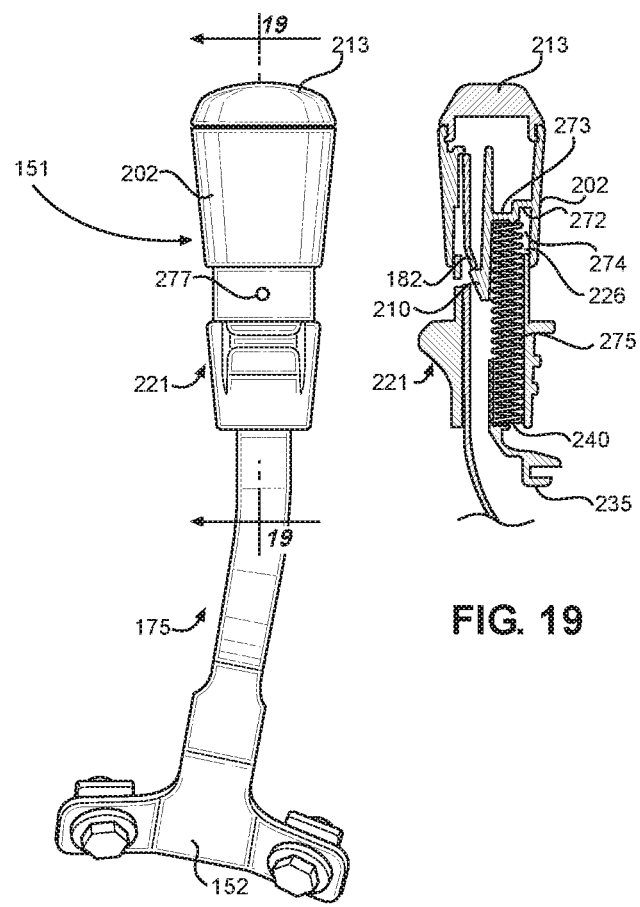
FIG. 19 is a partial cross-sectional view of the lever of FIG. 18 along line 19, in accordance with at least one embodiment of the disclosure.
Figure 18:
FIG. 18 is a side perspective view of a lever in the locked position, in accordance with at least one embodiment of the disclosure.

The lever 151, attached to the shutter 80, can include button 221 and shutter lever knob 201. The button 221 can be slidably received into the shutter lever knob 201. FIGS. 17-21 show details of an exemplary slidable arrangement. FIG. 17, as well as FIGS. 18-19, show button 221 in a locked position. In such locked position, the button 221 is biased, by spring 240, away from the shutter lever knob 201 and toward the cover 250. As a result of such spatial position, a wedge tab 235, of the button 221, can be pressed against the cover 250 so as to secure the lever 151 from rotational movement. As shown in FIG. 13, for example, the cover 250 can be provided with shoulders, notches, recesses, or other structure so as to engage with the wedge tab 235 so as to prevent rotation of the lever 151.

The button 221 can include an engagement surface 232, as described above, so as to assist in a user pressing down upon the button 221.

As shown in FIGS. 17 and 19, the lever 151 can include a spring 240. The spring 240 can serve to bias the button 221 away from the shutter lever knob 201 and towards the cover 250, i.e. so as to engage the wedge tab 235 with the cover 250. The shutter lever knob 201 can include an inner annular flange, shelf or stop 272 that extends around an inner diameter of the shutter lever knob 201. The inner annular flange 272 can limit upward travel of the button 221 relative to the shutter lever knob 201. Travel of the button 221 downward, relative to the shutter lever knob 201, can be limited by the wedge tab 235 engaging with the cover 250. The shutter lever knob 201 can be secured upon the engagement arm 175 by the interior ridge 182, of the engagement arm 175, engaging with the prong 210. The interior ridge 182 can include a portion or strip of the engagement arm 175 that is punched and/or bent at an angle to the surrounding surface, of the engagement arm 175, so as to form the interior ridge 182. The interior ridge 182 may also be characterized and/or be understood to include a detent.

The button 221 can also include a hole 277, to assist in dis-assembly if needed. Specifically, a pin or similar structure may be inserted through the hole 277 so as to bend the prong 210 away from engagement with the interior ridge 182. As a result, due to the prong 210 being spaced from the interior ridge 182, i.e., so as to "clear" the interior ridge 182, the shutter lever knob 201 can be pulled off the engagement arm 175 to provide dis-assembly.

The shutter lever knob 201 can include a prong support 273. The prong support 273 can include a flange or web that extends from an interior surface of the shutter lever knob 201 and that serves to support the prong 210. The prong support 273 can also include and/or be integrated with a spring support 276. The spring support 276 can support the spring 240. The spring support 276 can be a prong and can be dimensioned so as to a "light" friction fit or loose fit with an interior diameter of the spring 240. The prong support 273 can also be integrated or include the inner annular flange 272.

As described above, the spring 240 can be supported by the spring support 276. The shutter lever knob 201 can include an upper spring receiving cavity 274. The button 221 can include a lower spring receiving cavity 275. Both the cavities 274, 275 can include an opening, aperture, channel, or other structure that serves to retain or hold the spring 240 while still allowing functional stretching and compression of the spring 240.

FIG. 18 is a side perspective view of a lever 151 in the locked position, in accordance with at least one embodiment of the disclosure. FIG. 19 is a partial cross-sectional view of the lever of FIG. 18 along line 19, in accordance with at least one embodiment of the disclosure. The lever 151 can include the attachment plate 152, for attachment to a shutter. The lever 151 can also include a knob cap 213. In the "locked" arrangement of FIG. 19, the button 221 can be biased away from the shutter lever knob 201, so that the wedge tab 235 engages in a locking manner with the cover 250.

Figure 21:
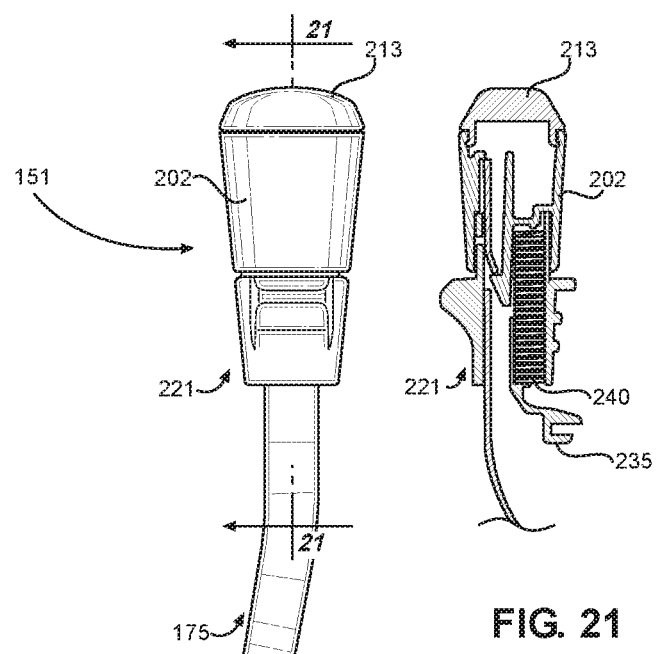
FIG. 21 is a partial cross-sectional view of the lever of FIG. 20 along line 21, in accordance with at least one embodiment of the disclosure.
Figure 20:
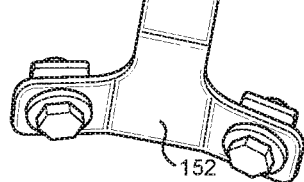
FIG. 20 is a side perspective view of a lever in the un-locked position, in accordance with at least one embodiment of the disclosure.

FIG. 20 is a side perspective view of a lever 151 in the un-locked position, in accordance with at least one embodiment of the disclosure. FIG. 21 is a partial cross-sectional view of the lever of FIG. 20 along line 21, in accordance with at least one embodiment of the disclosure. In the un-locked position or arrangement of FIG. 21, the upper end or surface of the button 221 can be abutted or engaged with the inner annular flange or stop 272. As otherwise described herein, in the un-locked position, a user is able to rotate the lever 151 (and connected shutter 80) so as to move the shutter 80 from a mulching position to a discharge position, for example.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques might be utilized. Also, metal stamping or cutting can be utilized. For example, metal stamping or cutting can be utilized in construction of the lever 151 including the recessed portion 181 and U-shape of the lever 151.

While the subject matter has been described in detail with reference to exemplary embodiments thereof, it will be apparent to one skilled in the art that various changes can be made, and equivalents employed, without departing from the scope of the disclosure.

Although the cover 250 is shown as having a first lever lock position 148 and a second lever lock position 149, the cover 250 can include one or more intermediate lock positions between the first lever lock position 148 and the second lever lock position. Each of the intermediate lever lock positions can be used to lock the shutter 80 in a corresponding one or more positions that is/are between the first shutter position 84 and the second shutter position. Each intermediate lever lock position(s) can provide a corresponding amount of mulched vegetation and discharged vegetation. Each intermediate lock position can be demarcated by a notch or recessed portion extending into the shoulder 253.

For example, embodiments are disclosed above in which the button slide surface 224, of the button 221, is received within the knob slide surface 207 of the shutter lever knob 201. However, embodiments are intended to include or otherwise cover a construct in which a slide surface of the shutter lever knob 201 is received within a slide surface of the button 221.

For example, embodiments are disclosed above in which the shutter lever knob 201 or portions thereof is constructed of a single or unitary piece. However, embodiments are intended to include or otherwise cover a shutter lever knob 201 that includes or is constructed of multiple pieces. For example, the multiple pieces of shutter lever knob 201 can be injection molded in pieces and then connected together such as by heat bonding or adhesive, for example.

For example, embodiments are disclosed above in which the button 221 or portions thereof is constructed of a single or unitary piece. However, embodiments are intended to include or otherwise cover a button 221 that includes or is constructed of multiple pieces. For example, the multiple pieces of button 221 can be injection molded in pieces and then connected together such as but not limited to heat bonding or adhesive or mechanical fasteners, for example.

For example, embodiments are disclosed above in which the cover 250 or portions thereof is constructed of a single or unitary piece. However, embodiments are intended to include or otherwise cover a cover 250 that includes or is constructed of multiple pieces. For example, the multiple pieces of cover 250 can be injection molded in pieces and then connected together such as by heat bonding or adhesive, for example. For example, embodiments are disclosed above in which the shutter lever knob 201, the button 221 and cover 250 include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter assembly is intended to be utilized.

What is claimed is:

1. A shutter assembly for a lawnmower comprising:
   a cutter housing that includes a discharge opening and a cutter housing slot passing through the cutter housing, and the cutter housing slot having a first end and a second end;
   a shutter that includes a blocking panel, the shutter rotatably attached to the cutter housing so as to be movable between (a) a first shutter position in which the blocking panel is positioned such that the blocking panel opens the discharge opening, and (b) a second shutter position in which the blocking panel is positioned such that the blocking panel closes the discharge opening, and the second shutter position corresponds to a mulching position; and
   a lever abutting the shutter and extending through the cutter housing slot, the lever engageable by a user so as to move the shutter between the first shutter position and the second shutter position, and the lever includes a handle knob assembly that includes a button that is biased, by a spring, to lock in any one of a plurality of positions on the cutter housing.

2. The shutter assembly of claim 1, wherein the plurality of positions includes:

a first lever lock position that corresponds to the shutter being in the first shutter position so as to allow cut clippings to be discharged through the discharge opening, and a second lever lock position that corresponds to the shutter being in the second shutter position so as to allow mulching of the cut clippings.

3. The shutter assembly of claim 2, wherein the button is slidable along an engagement arm of the lever such that the button can move from a locked position, to lock in any one of the positions, to an unlocked position in which the lever is free to move between each of the positions.

4. The shutter assembly of claim 2, wherein the shutter assembly further including a cover provided about the cutter housing slot, and the cover including:
    a first engagement face that engages the button when the lever is in the first lever lock position, and
    a second engagement face that engages the button when the lever is in the second lever lock position.

5. The shutter assembly of claim 2, wherein the button further including a wedge tab having a first wedge surface and a second wedge surface, and
    the shutter assembly further including a cover provided about the cutter housing slot, and the cover including:
        a first engagement face that engages the first wedge surface when the lever is in the first lever lock position, and
        a second engagement face that engages the second wedge surface when the lever is in the second lever lock position.

6. The shutter assembly of claim 5, wherein the first wedge surface and the second wedge surface being angled relative to each other such that the wedge surfaces are farther apart at a top portion of the wedge tab than at a bottom portion.

7. The shutter assembly of claim 5, wherein the cover including a shoulder, the shoulder including the first engagement face and the second engagement face at opposing ends of the shoulder, and
    the shoulder further including a top slide face upon which the wedge tab is adapted to slide when moving from the first lever lock position to the second lever lock position.

8. The shutter assembly of claim 1, wherein the handle knob assembly further includes a shutter lever knob provided at an upper end of the lever, the shutter lever knob is configured to be grasped by a user along with the button so as to manipulate the shutter, and the shutter lever knob includes a knob body, and
    the lever including an engagement arm, and the engagement arm extending through the knob body.

9. The shutter assembly of claim 8, wherein the button includes a button slide surface, and the shutter lever knob includes a knob slide surface, and
    the button slide surface is slidable relative to the knob slide surface such that the button can slide from a locked position, to lock in any one of the positions, to an unlocked position in which the lever is free to move between each of the positions; and
    the spring biasing the button to the locked position.

10. The shutter assembly of claim 9, wherein the button slide surface being received within the knob slide surface in a telescopic manner.

11. The shutter assembly of claim 9, wherein the spring being received in the shutter lever knob and the spring being received in the button such that the spring biases the shutter lever knob away from the button and to the locked position.

12. The shutter assembly of claim 8, wherein the knob body further including a prong that extends from the knob body and snaps onto the engagement arm so as to secure the knob body to the engagement arm.

13. The shutter assembly of claim 12, wherein the button surrounding the prong and the engagement arm having a U-shape.

14. The shutter assembly of claim 1, wherein the handle knob assembly further including a shutter lever knob, and the shutter lever knob including an upper spring receiving cavity,
    the button being movable toward and away from the shutter lever knob and including a lower spring receiving cavity,
    the spring being retained by the upper spring receiving cavity and the lower spring receiving cavity, the spring biasing the button away from the shutter lever knob, and the knob compressing the spring when the button moves toward the shutter lever knob.

15. The shutter assembly of claim 1, wherein the handle knob assembly further includes a shutter lever knob provided at an upper end of the lever above the button, the shutter lever knob is configured to be grasped by a user along with the button so as to manipulate the shutter, and the shutter lever knob includes a knob body and a knob cap, and the lever including an engagement arm;
    the engagement arm extending through the knob body, and the knob cap provided at an upper end of the knob body.

16. The shutter assembly of claim 1, wherein the lever is fixed relative to the shutter.

17. The shutter assembly of claim 1, wherein the shutter rotates about an axis, and
    the cutter housing slot extends along an arc of a circle that is concentric with the axis.

18. The shutter assembly of claim 1, wherein the lever includes an attachment plate, and the attachment plate attaching the lever to the shutter.

19. A lawnmower comprising:
    a shutter assembly that includes:
        a cutter housing that includes a discharge opening and a cutter housing slot;
        a shutter that includes a blocking panel, the shutter rotatably attached to the cutter housing so as to rotate about an axis between (a) a first shutter position in which the blocking panel is positioned such that the discharge opening is opened by the blocking panel, and (b) a second shutter position in which the blocking panel is positioned such that the discharge opening is closed by the blocking panel, and the second position corresponds to a mulching position; and
        a lever attached to the shutter and extending through the cutter housing slot, the lever engageable by a user so as to move the shutter between the first shutter position and the second shutter position, and the lever includes a handle knob assembly that includes a button that is biased, by a spring, to lock in any one of a plurality of positions on the cutter housing; and
    a prime mover mounted on the cutter housing and configured to rotate about the axis a blade for cutting vegetation, wherein
    each of the plurality of positions on the cutter housing are spaced along an arc of a circle that is concentric with the axis.

20. A convertible lawnmower that is configured to be converted between a discharging mode and a mulching mode, the lawnmower comprising:
- a cutter housing that includes a discharge opening, a discharge chute in communication with the discharge opening, and a cutter housing slot in the cutter housing;
- a collection bag removably connected to the cutter housing and configured to receive vegetation clippings passing through the discharge opening when the lawnmower is in the discharging mode;
- a shutter that includes a shutter collar that is annular and a blocking panel attached to and extending away from the shutter collar, the shutter collar rotatably attached to the cutter housing so as to be movable between (a) a first shutter position in which the blocking panel is positioned such that the discharge opening is opened by the blocking panel and the vegetation clippings are directed through the discharge opening and toward the collection bag when the collection bag is connected to the discharge chute, and (b) a second shutter position in which the blocking panel is positioned such that the discharge opening is closed by the blocking panel, and the second position corresponds to a mulching position; and
- a lever abutting the shutter collar and extending through the cutter housing slot, the lever engageable by a user so as to move the shutter between the first shutter position and the second shutter position, and the lever includes a handle knob assembly that includes a button that is biased, by a spring, to lock in any one of a plurality of positions on the cutter housing, and wherein the plurality of positions includes:
- a first lever lock position that corresponds to the shutter being in the first shutter position so as to allow cut clippings to be discharged through the discharge opening, and
- a second lever lock position that corresponds to the shutter being in the second shutter position so as to allow mulching of the cut clippings.

* * * * *